United States Patent
Albertson et al.

(10) Patent No.: US 12,259,079 B2
(45) Date of Patent: Mar. 25, 2025

(54) SEALING PLUG ASSEMBLIES, SEALING ELEMENTS, AND BLEED LANCES FOR LINE STOPPING A PIPE AND SYSTEMS AND METHODS THEREOF

(71) Applicant: WeldFit LLC, Houston, TX (US)

(72) Inventors: David Albertson, Skiatook, OK (US); Brian Anderson, Tomball, TX (US); Paul Hatch, Edmond, OK (US); Ray Prater, Kiefer, OK (US); Joaquin Reyes Espinosa, Sand Springs, OK (US); Robert Niksich, Corpus Cristi, TX (US); Timothy Irelan, League City, TX (US); Brian Gresh, Tulsa, OK (US)

(73) Assignee: WELDFIT LLC, Houston, TX (US)

( * ) Notice: Subject to any disclaimer, the term of this patent is extended or adjusted under 35 U.S.C. 154(b) by 0 days.

(21) Appl. No.: 18/773,945

(22) Filed: Jul. 16, 2024

(65) Prior Publication Data
US 2024/0369170 A1 Nov. 7, 2024

Related U.S. Application Data

(63) Continuation of application No. PCT/US2023/080159, filed on Nov. 16, 2023.

(60) Provisional application No. 63/426,607, filed on Nov. 18, 2022.

(51) Int. Cl.
F16L 55/124 (2006.01)
(52) U.S. Cl.
CPC .................. F16L 55/124 (2013.01)

(58) Field of Classification Search
CPC .................................................. F16L 55/124
USPC ............................................................ 138/94
See application file for complete search history.

(56) References Cited

U.S. PATENT DOCUMENTS

| | | | |
|---|---|---|---|
| 7,546,847 B2 * | 6/2009 | Morrison | F16L 55/1604 137/317 |
| 7,849,882 B1 * | 12/2010 | Lee | F16L 55/124 138/91 |
| 2008/0017390 A1 * | 1/2008 | Bowie | F16L 55/124 166/123 |
| 2009/0114302 A1 | 5/2009 | Yeazel et al. | |

(Continued)

FOREIGN PATENT DOCUMENTS

GB 2586464 A * 2/2021 ............ F16L 55/124
WO 2024108051 A2 5/2024

OTHER PUBLICATIONS

International Searching Authority for International Search Report and Written Opinion for PCT/US23/80159 dtd Apr. 15, 2024, 14 pages.

*Primary Examiner* — Patrick F Brinson
(74) *Attorney, Agent, or Firm* — William R. Childs; Childs Patent Law PLLC

(57) ABSTRACT

The present disclosure provides a sealing plug assembly for stopping flow of a product in a pipe, the assembly having two sealing elements and having an isolation zone in the assembly which can be drained by a bleed lance to maintain pressure in the isolation zone within a safe limit. The present disclosure further provides sealing elements, bleed lances, systems, and methods of using the same. A benefit of the sealing plug assembly, and methods of using the same, can include forming safer seals during line stopping and the efficiency of recovering product.

11 Claims, 17 Drawing Sheets

(56) References Cited

U.S. PATENT DOCUMENTS

| | | | |
|---|---|---|---|
| 2011/0100649 A1* | 5/2011 | Bowie | G01M 3/022 |
| | | | 166/387 |
| 2013/0192695 A1* | 8/2013 | Bowie | F16L 55/124 |
| | | | 137/511 |
| 2020/0309308 A1 | 10/2020 | Naber et al. | |
| 2021/0325004 A1 | 10/2021 | Gresh et al. | |
| 2022/0299149 A1* | 9/2022 | Naber | F16L 55/105 |

* cited by examiner

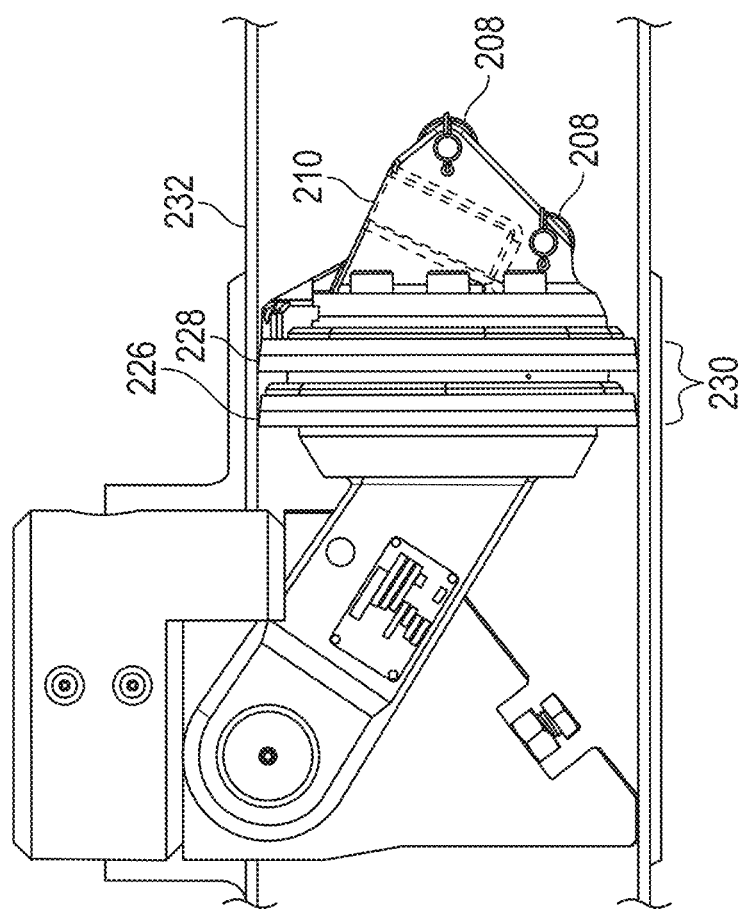
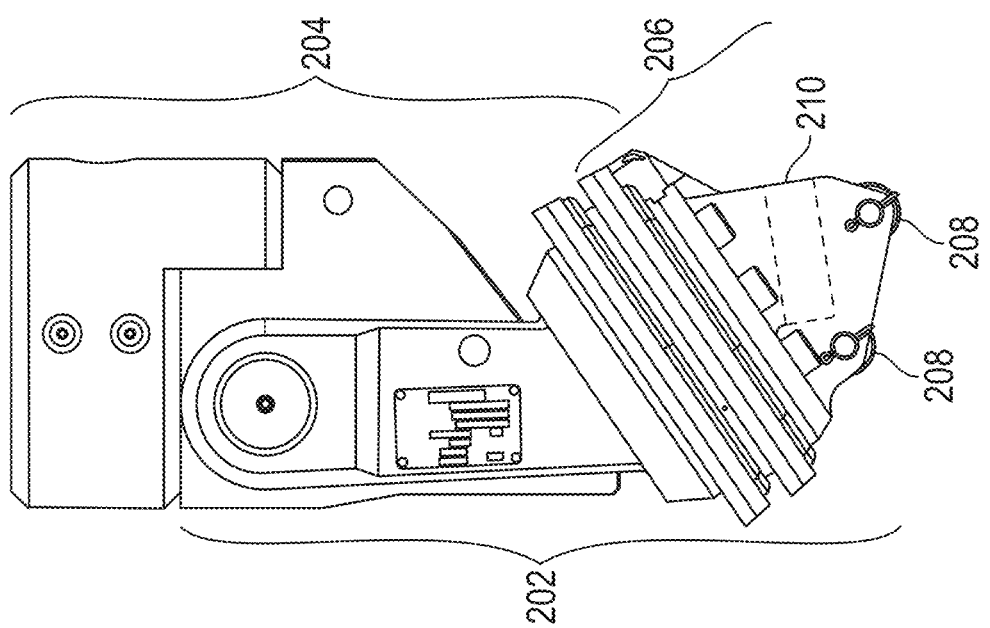
FIG. 2B
FIG. 2A

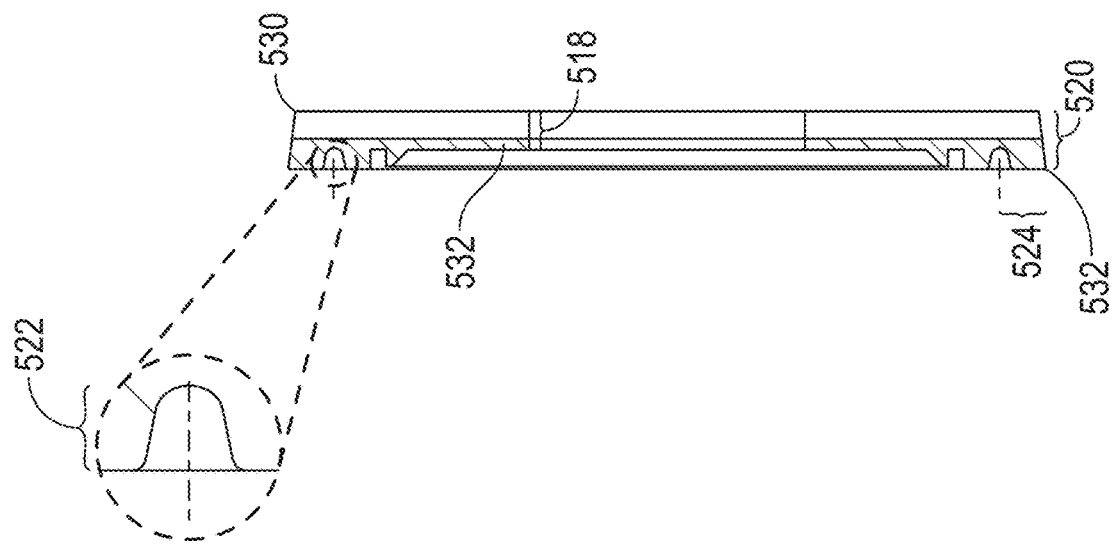
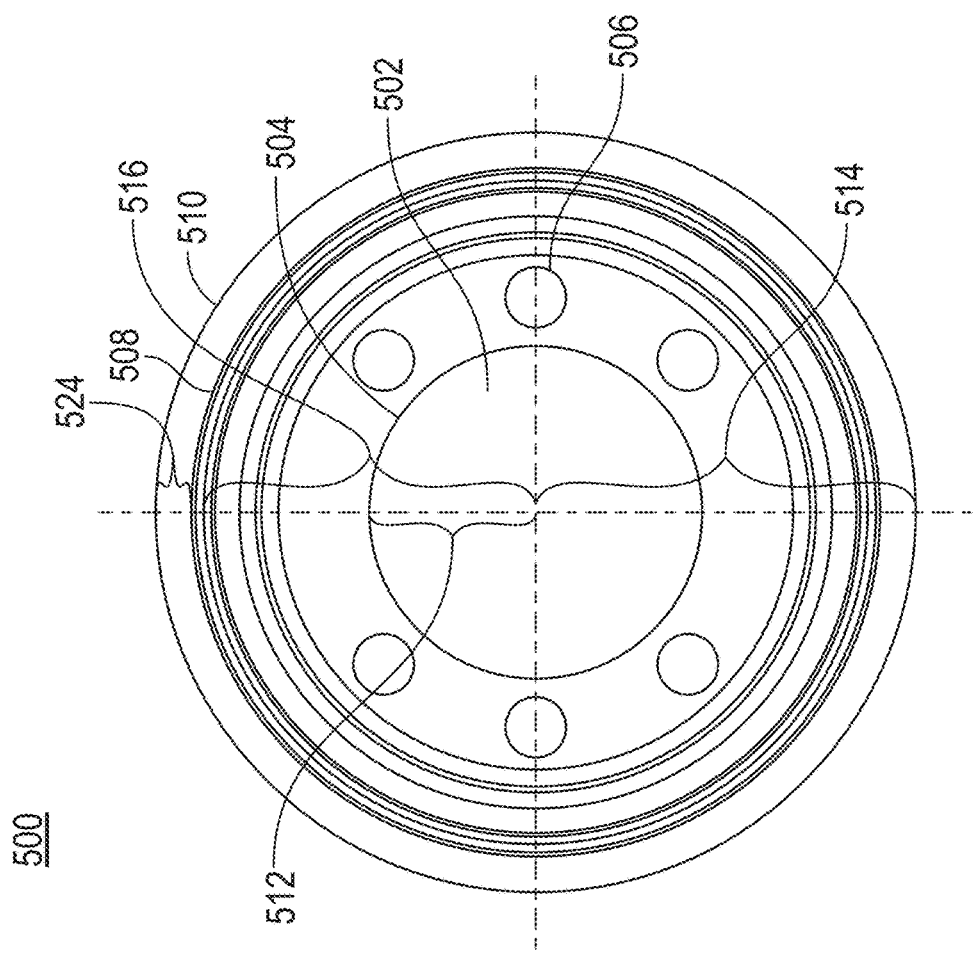

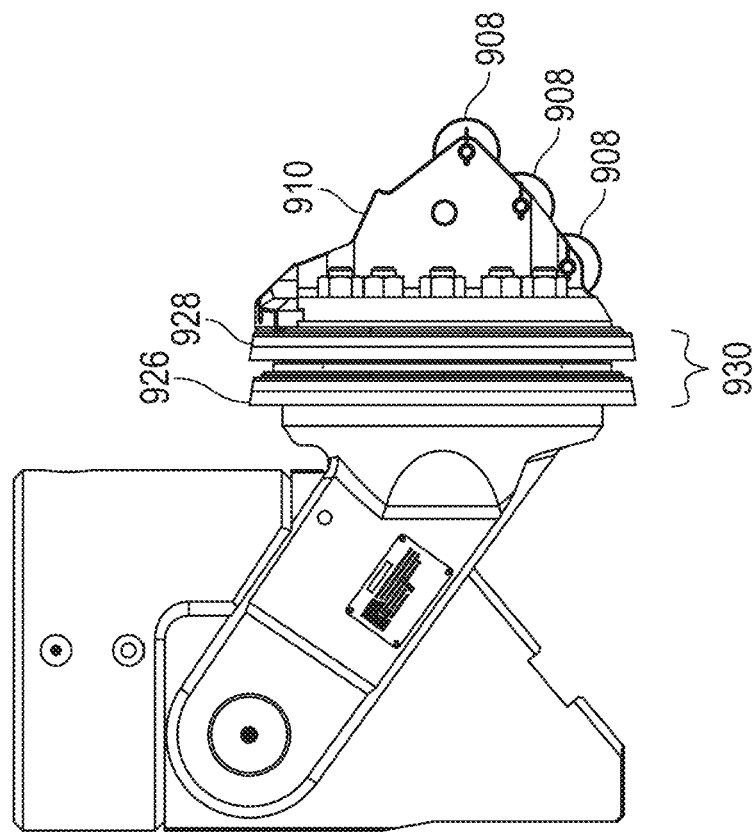
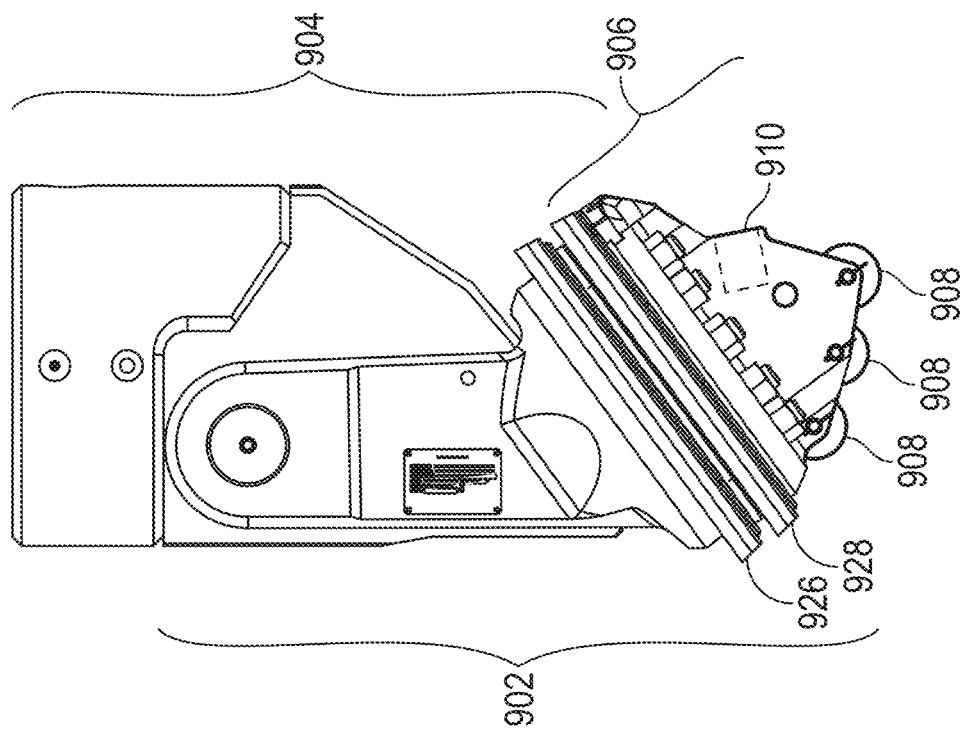
FIG. 9B
FIG. 9A

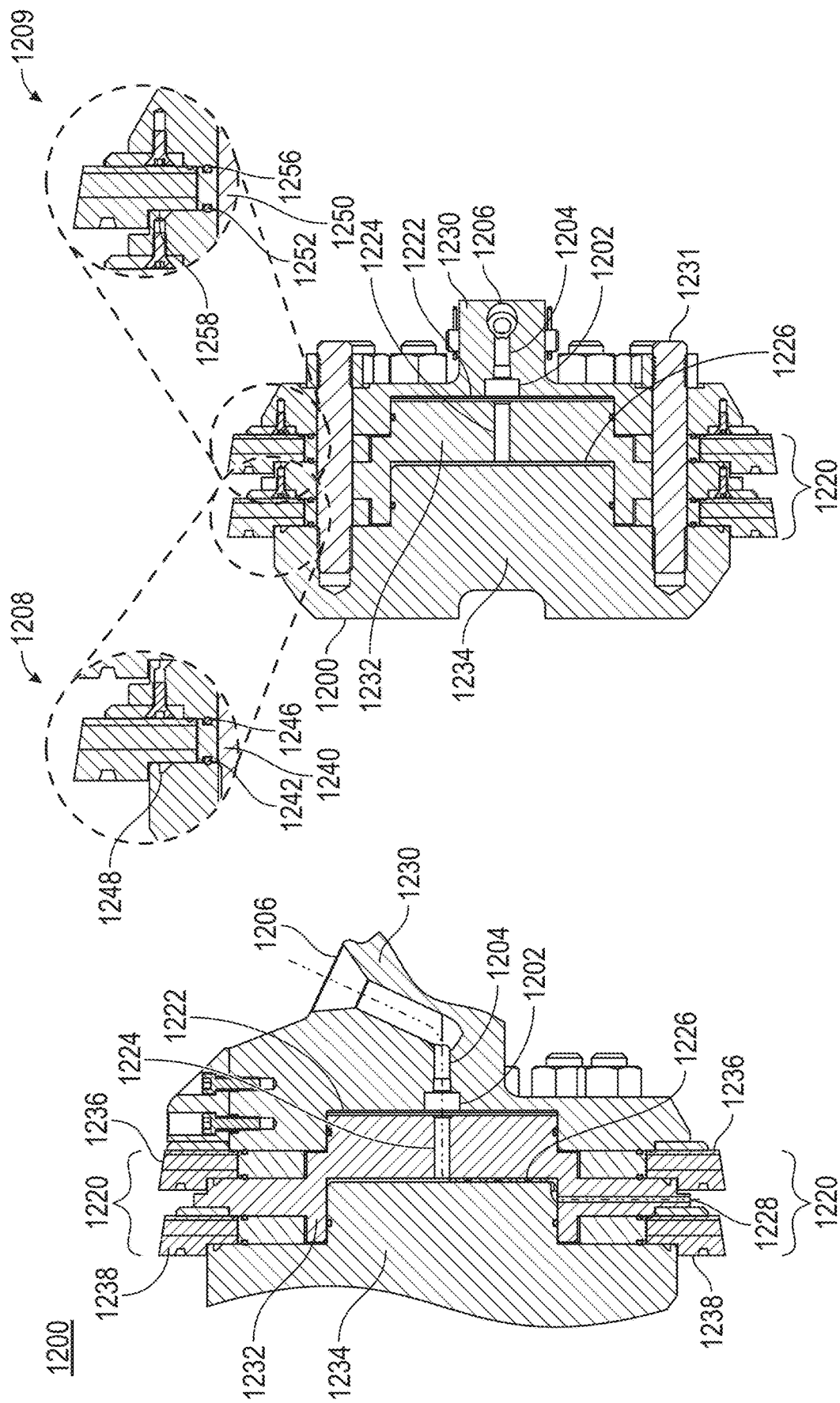

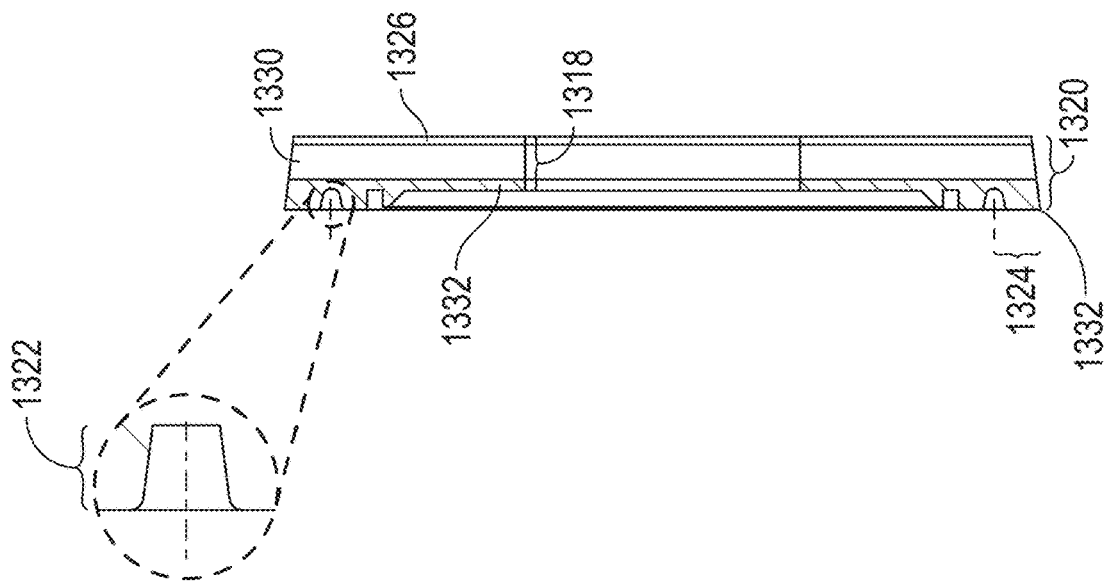
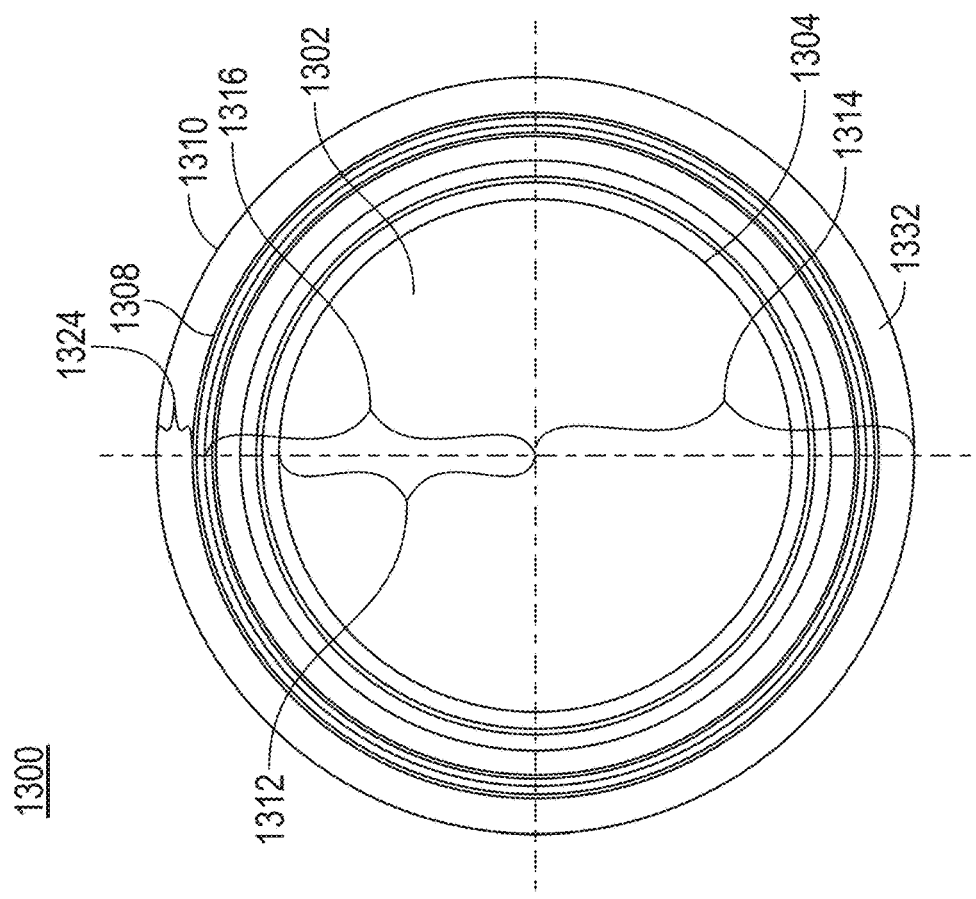
FIG. 13A
FIG. 13B

SEALING PLUG ASSEMBLIES, SEALING ELEMENTS, AND BLEED LANCES FOR LINE STOPPING A PIPE AND SYSTEMS AND METHODS THEREOF

CROSS REFERENCE TO RELATED APPLICATIONS

This application claims priority to and is a continuation of PCT Application No. PCT/US23/80159, filed on Nov. 16, 2023, which claims priority to U.S. Provisional 63/426,607, filed on Nov. 18, 2022, the entirety of which are incorporated by reference.

TECHNICAL FIELD

The present disclosure relates to the field of pipes as well as products, systems, and methods of repairing pipes, especially when those pipes are in use and continue to carry gases, liquids, or slurries.

BACKGROUND

It is often necessary to cut into a pipeline to make repairs downstream while the pipeline is in use and contains product. For example, once a nuclear power reactor is operating, it can be difficult or impossible to quickly stop the reactor. Therefore, it is critical that water used to cool the reactor be allowed to flow unimpeded, even during repairs and maintenance of pipes. Similarly, stopping production of an oil pipeline could delay production, resulting in lost profits. Having to stop the use of a water pipe or a sewage pipe could result in a loss of service during repairs and require re-sanitization of the entire process apparatus before pumping can resume.

Fortunately, methods have been developed that allow for pipes to be safely diverted during use so that repairs and maintenance can take place. This process is known in the industry as "hot-tapping" or "line stopping." This hot-tapping process involves fixing a fitting, such as a split-T fitting, around the pipe, cutting and removing a portion of the pipe (known as a "coupon") using a hole saw to allow access to the pipe, and then inserting a plug assembly into the pipe so as to stop the flow of product from upstream to downstream in the pipe while diverting that flow of product through the split-T fitting and a pipe or outlet attached thereto. This procedure stops the flow of product downstream of the pipeline, so that the downstream pipe can be repaired, or a maintenance routine can be performed, with minimal interruption.

Once the downstream repair or maintenance is finished, the process can be reversed. That is, the plug assembly can be withdrawn from the pipe through the split-T fitting, and a completion plug emplaced to seal the pipe. This method restores the flow of the product from the upstream side of the pipe to the downstream side of the pipe.

Considering the importance of line stopping in modern industry, it is desirable to improve the tools, methods, and systems used for line stopping so that line stopping can be made safer and more efficient under various field conditions, such as high-pressure conditions. It remains desirable to provide products, methods, and systems for line-stopping that better avoid leaks during an operation.

BRIEF SUMMARY

A sealing plug assembly is provided herein. In some embodiments, sealing plug assembly includes: a plugging head, a proximal sealing element, a distal sealing element, an isolation plate, and a nose piece, wherein the proximal sealing element is located closer to the plugging head than the distal sealing element, and wherein proximal sealing element protrudes around an exterior of the sealing plug assembly, wherein the distal sealing element is located closer to the nose piece than the proximal sealing element, and wherein the distal sealing element protrudes around the exterior of the sealing plug assembly, and wherein the isolation plate is contained in an interior of the sealing plug assembly and located between the proximal sealing element and the distal sealing element.

In some embodiments of the sealing plug assembly, the nose piece has a product port located on the exterior of the sealing plug assembly and the product port is connected to the isolation plate by a nose flow pathway, and wherein the nose flow pathway can be accessed by connecting a bleed lance to the product port; or wherein the nose piece has a product port located on the exterior of the sealing plug assembly and the product port is connected to the isolation plate by a nose flow pathway, and wherein the product port of the nose piece is configured to or has a product port surface that is complimentary to a stab inlet of a bleed lance, and the product port is configured to be opened or closed by insertion and rotation of the stab inlet of the bleed lance. In some embodiments, the sealing plug assembly further includes: a proximal nose ring and a distal nose ring, wherein the proximal nose ring and the isolation plate are located between the proximal sealing element and the distal sealing element, and wherein the distal nose ring is located between the distal sealing element and the nose piece. In some embodiments of the sealing plug assembly, the proximal sealing element includes a flat face, an elastomeric face, an outer edge having an exterior diameter, and an inner edge having an interior diameter, and wherein the elastomeric face has a circular groove extending a circular groove depth into the elastomeric face, and wherein at least one of the inner edge, the outer edge, and the circular groove of the proximal sealing element is coaxial with the exterior of the sealing plug assembly, the plugging head, or both; and wherein the outer edge has an outer edge axial thickness of from about 1.8 cm to about 10.2 cm, or wherein the inner edge has an inner edge axial thickness of from about 1.2 cm to about 10.2 cm, or wherein the exterior diameter is from about 7.6 cm to about 142.3 cm, or wherein an outer edge of the circular groove is located a radial distance of from about 1.2 cm to about 15.3 cm from the outer edge of the proximal sealing element, or wherein the circular groove depth is from about 0.6 cm to about 3.9 cm. In some embodiments of the sealing plug assembly, the distal sealing element includes a flat face, an elastomeric face, an outer edge having an exterior diameter, and an inner edge having an interior diameter, and wherein the elastomeric face has a circular groove extending a circular groove depth into the elastomeric face, and wherein at least one of the inner edge, the outer edge, and the circular groove of the distal sealing element is coaxial with the exterior of the sealing plug assembly, the plugging head, or both; and wherein the outer edge has an outer edge axial thickness of from about 1.8 cm to about 10.2 cm, or wherein the inner edge has an inner edge axial thickness of from about 1.2 cm to about 10.2 cm, wherein the exterior diameter is from about 7.6 cm to about 142.3 cm, or wherein an outer edge of the circular groove is located a radial distance of from about 1.2 cm to about 15.3 cm from the outer edge of the distal sealing element, or wherein the circular groove depth is from about 0.6 cm to about 3.9 cm. In some embodiments, the sealing plug assembly further includes a proximal nose ring and a distal nose ring, wherein a portion of the plugging head directly contacts or is adjacent to the proximal sealing element, a portion of the proximal sealing element directly contacts or is adjacent to the proximal nose ring, a portion of the proximal nose ring directly contacts or is adjacent to the isolation plate, a portion of the isolation plate directly contacts or is adjacent to the distal sealing element, a portion of the distal sealing element directly contacts or is adjacent to the distal nose ring, and the distal nose ring directly contacts or is adjacent to the nose piece; or further includes: a proximal isolation ring, a proximal nose ring, a distal isolation ring, and a distal nose ring, wherein a portion of the plugging head directly contacts or is adjacent to the proximal isolation ring or the isolation plate, wherein a portion of the proximal isolation ring directly contacts or is adjacent to the proximal sealing element, wherein a portion of the proximal sealing element directly contacts or is adjacent to the proximal nose ring, wherein the proximal nose ring directly contacts or is adjacent to a portion of the isolation plate, wherein a portion of the isolation plate directly contacts or is adjacent to the distal isolation ring or the nose piece, wherein a portion of the distal isolation ring directly contacts or is adjacent to the distal sealing element, wherein a portion of the distal sealing element directly contacts or is adjacent to the distal nose ring, and wherein a portion of the distal nose ring directly contacts or is adjacent to the nose piece. In some embodiments of the sealing plug assembly, the isolation plate includes a cylindrical raised portion on a distal face of the isolation plate, a cylindrical depressed portion on a proximal face of the isolation plate, an axial passage that passes through a center of the isolation plate, and one or more radial fluid pathways, wherein the radial fluid pathways connect an isolation plate radial port to an isolation zone port, wherein isolation plate radial port is located on an outer edge of the isolation plate and the isolation zone port is located on an inner edge of the cylindrical depressed portion of the isolation plate; and wherein the isolation radial port is fluidly connected by the radial fluid pathway to the isolation zone port, wherein the isolation zone port is fluidly connected by the axial passage to a nose flow pathway of the nose piece, and the nose flow pathway of the nose piece is fluidly connected to a product port located on an exterior of the nose piece.

The present disclosure provides a sealing element for a sealing plug assembly. In some embodiments, sealing element includes a flat face, an elastomeric face, an outer edge having an exterior diameter, and an inner edge having an interior diameter, and wherein the elastomeric face has a circular groove extending a circular groove depth into the elastomeric face, wherein at least one of the inner edge, the outer edge, and the circular groove of the sealing element are concentric, and wherein an outer edge of the circular groove is located a radial distance of from about 1.2 cm to about 15.3 cm from the outer edge of the sealing element, or wherein the groove depth is from about 0.6 cm to about 3.9 cm. In some embodiments, sealing element includes at least a portion of the flat face includes a fabric or a rubber, and wherein the outer edge having an outer edge axial thickness of from about 1.8 cm to about 10.2 cm, or wherein the inner edge having an inner edge axial thickness of from about 1.2 cm to about 10.2 cm, or wherein the exterior diameter is from about 7.6 cm to about 142.3 cm.

The present disclosure provides a bleed lance for draining an isolation zone of a sealing plug assembly. In some embodiments, the bleed lance for draining an isolation zone of a sealing plug assembly includes: a stab inlet, a body, and a bleed lance exit, wherein the body includes a hollow pipe or tube, and the body is connected to the stab inlet and the bleed lance exit by a lance flow pathway. In some embodiments of the bleed lance, the stab inlet has a stab inlet exterior that contains a stab inlet opening and the stab inlet exterior is configured to fit or has a shape complimentary to a product port on a nose piece of a sealing plug assembly; or wherein the body includes a rigid material and has a body length of from about 10 cm to about 500 cm and a body internal diameter of from about 0.5 cm to about 5.0 cm; or wherein the stab inlet has a stab inlet exterior that contains a stab inlet opening and wherein the stab inlet includes a stab inlet adapter, wherein a bottom end the stab inlet adapter is configured to fit or has a shape complementary to a product port on a nose piece of a sealing plug assembly; wherein a top end of the stab inlet adapter is configured to fit or has a shape complementary to the stab inlet exterior; or wherein the stab inlet has an exterior surface that contains a pin protruding from the stab inlet exterior.

The present disclosure also provides a method of stopping a pipe containing a product. In some embodiments, the method includes: providing a sealing plug assembly connected to a sealing plug housing, wherein the sealing plug assembly includes a plugging head, a proximal sealing element, a distal sealing element, an isolation plate, and a nose piece, wherein the proximal sealing element is located closer to the plugging head than the distal sealing element, and wherein proximal sealing element protrudes around an exterior of the sealing plug assembly, wherein the distal sealing element is located closer to the nose piece than the proximal sealing element, and wherein the distal sealing element protrudes around the exterior of the sealing plug assembly, and wherein the isolation plate is contained in an interior of the sealing plug assembly and located between the proximal sealing element and the distal sealing element; and sealing the pipe containing the product by sealing the outer edge of the proximal sealing element and the outer edge of the distal sealing element against an interior surface of the pipe.

In some embodiments of the method, the nose piece has a product port located on the exterior of the sealing plug assembly and the product port is connected or fluidly connected to the isolation plate by a nose flow pathway. In some embodiments, the method further includes: accessing the product port by cutting an opening into the pipe containing the product, and opening the nose flow pathway of the product port by inserting a bleed lance into the product port and rotating the bleed lance. In some embodiments, the method further includes: wherein the bleed lance includes a stab inlet, a body, and a bleed lance exit, wherein the body includes a hollow pipe or tube, and the body is connected to the stab inlet and the bleed lance exit by a lance flow pathway, and wherein the product can be a liquid, a slurry, a gas, or any combination thereof, flowing the product from the fluid product though the bleed lance exit. In some embodiments, the method further includes: attaching a tube or hose to the bleed lance exit and collecting at least a portion of the product.

The present disclosure further provides a system for stopping a pipe containing a liquid, gas, or slurry product. In some embodiments, the system includes a plugging head, a proximal sealing element, a distal sealing element, an isolation plate, and a nose piece, wherein the proximal sealing element is located closer to the plugging head than the distal sealing element, and wherein proximal sealing element protrudes around an exterior of the sealing plug assembly, wherein the distal sealing element is located closer to the nose piece than the proximal sealing element, and wherein the distal sealing element protrudes around the exterior of the sealing plug assembly, and wherein the isolation plate is contained in an interior of the sealing plug assembly and located between the proximal sealing element and the distal sealing element, wherein the nose piece has a product port located on the exterior of the sealing plug assembly and the product port is connected to the isolation plate by a nose flow pathway; and a bleed lance, wherein the bleed lance includes a stab inlet, a body, and a bleed lance exit, wherein the body includes a hollow pipe or tube, and the body is connected to the stab inlet and the bleed lance exit by a lance flow pathway, and wherein the product port of the nose piece is configured to or has a product port surface that is complimentary to the stab inlet of a bleed lance, and the product port is configured to be opened or closed by insertion and rotation of the stab inlet of the bleed lance.

BRIEF DESCRIPTION OF THE DRAWINGS

The foregoing summary, as well as the following detailed description of the embodiments, will be better understood when read in conjunction with the attached drawings. For the purpose of illustration and evidence, there are shown in the drawings, some embodiments, which may be preferable. It should be understood that the embodiments depicted are not limited to the precise details shown. Moreover, the embodiments depicted are not drawn to scale.

FIG. 2A shows a side view of an exemplary embodiment of a sealing plug assembly in an extended position, as it would be during insertion into a pipe, in accordance with embodiments of the present disclosure.

FIG. 2B shows a side view of the sealing plug assembly of FIG. 2A in a sealing position, as it would upon sealing of a pipe, in accordance with embodiments of the present disclosure.

FIG. 5A shows a rear view of an exemplary embodiment of the sealing element of the sealing plug assembly of FIGS. 2A and 2B, in accordance with embodiments of the present disclosure.

FIG. 5B shows a side cut away view of the sealing element of FIG. 5A, in accordance with embodiments of the present disclosure.

FIGS. 9-14 show another exemplary embodiment of the sealing plug assembly as part of an embodiment for a system for stopping a pipe containing a liquid or gas product, in accordance with embodiments of the present disclosure.

FIG. 9A shows a side view of an exemplary embodiment of a sealing plug assembly in an extended position, as it would be during insertion into a pipe, in accordance with embodiments of the present disclosure.

FIG. 9B shows a side view of the sealing plug assembly of FIG. 9A in a sealing position, as it would upon sealing of a pipe, in accordance with embodiments of the present disclosure.

FIG. 10 shows a cutaway view of the sealing plug assembly of FIG. 9B in a sealing position, as it would upon sealing of a pipe, in accordance with embodiments of the present disclosure.

FIG. 12A shows a cutaway side view of the sealing plug assembly of FIG. 10, but through a different layer, emphasizing connected fluid passages of the sealing plug assembly.

FIG. 12B shows a cutaway top view of the sealing plug assembly of FIG. 12A.

FIG. 13A shows a rear view of an exemplary embodiment of the sealing element of the sealing plug assembly of FIG. 9A, in accordance with embodiments of the present disclosure.

FIG. 13B shows a side view of the sealing element shown in FIG. 13A, in accordance with embodiments of the present disclosure.

DETAILED DESCRIPTION

Figure 1A:
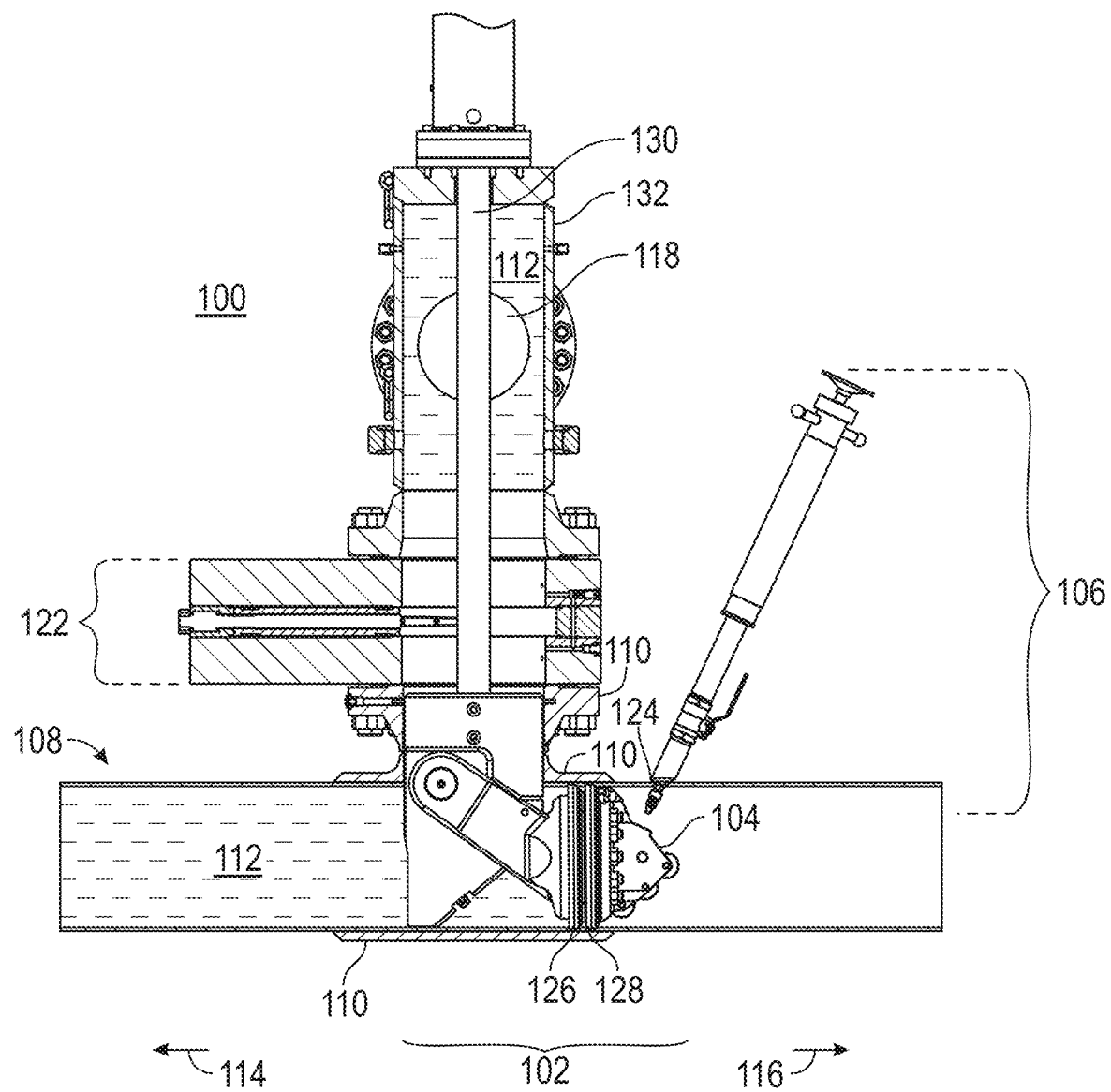
FIG. 1A shows a side cutaway view of an exemplary embodiment of the system for stopping a pipe containing a liquid or gas product, in accordance with embodiments of the present disclosure.

Unless otherwise noted, all measurements are in standard metric units.

Unless otherwise noted, all instances of the words "a," "an," or "the" can refer to one or more than one of the word that they modify.

Unless otherwise noted, the phrase "at least one of" means one or more than one of an object. For example, "at least one of the inner edge, outer edge, and circular groove of the proximal sealing element is coaxial with the exterior of the sealing plug assembly" means one inner edge, two or more inner edges, one outer edge, two or more outer edges, one circular groove, two or more circular grooves, or any combination thereof.

Unless otherwise noted, the term "about" refers to +10% of the non-percentage number that is described, rounded to the nearest number to the accuracy shown. For example, about 105.3 mm, would include 94.8 to 115.8 mm. Unless otherwise noted, the term "about" refers to +5% of a percentage number. For example, about 20% would include 15 to 25%. When the term "about" is discussed in terms of a range, then the term refers to the appropriate amount less than the lower limit and more than the upper limit. For example, from about 100 to about 200 mm would include from 90 to 220 mm.

Unless otherwise noted, the terms "provide", "provided" or "providing" refer to the supply, production, purchase, manufacture, assembly, formation, selection, configuration, conversion, introduction, addition, or incorporation of any element, amount, component, reagent, quantity, measurement, or analysis of any method or system of any embodiment herein.

Unless otherwise noted, the terms "fluidly" and "fluidically" are used interchangeably.

Unless otherwise noted, the term "fluidly connected" refers to two or more objects, and means that a fluid is capable of flowing from one object to another, but two or more objects may not be physically connected to one another.

Unless otherwise noted, the term "stab inlet" and "key inlet" are interchangeable and refer to a shape of inlet configured to be inserted into a port having a complementary shape.

Conventional sealing plugs for pipes are often solid metal plugs having one sealing element protruding around the circumference of the sealing plug. During operation, the sealing plug is inserted into the pipe interior and the one sealing element of the sealing plug is pressed against an interior surface of the pipe to form a seal. Generally, conventional sealing plugs are satisfactory for plugging operations of liquids or gases at low pressures.

However, when the pressure approaches or exceeds about 6,894 kPa (1,000 PSI), then conventional sealing plugs tend to fail or leak past their single sealing element. Such a failure or leak can result in a significant safety hazard for personnel working downstream of the plugging operation. For example, if the product is a flammable liquid, then a leak could lead to an accidental explosion. Similarly, if the product is a caustic liquid or a carcinogenic liquid, then a failure or leak could lead to chemical burns or cancer-causing contamination of workers. This situation tends to be even more precarious if the pipe being stopped contains solid debris, such as sand, dirt, or other solids, that might interfere with a tight seal of the one sealing element. Another safety threat can arise if some part of the product attacks or swells the material of the one sealing element because that would likely compromise the structural integrity of the one seal of conventional sealing plugs. In summary, conventional sealing elements usually place one and only one sealing element between a plugging operation and a potential accident that can jeopardize worker safety or reduce profits.

It has been discovered that it is possible to create a sealing plug assembly having 2 separate sealing elements. A benefit of a sealing plug assembly having 2 separate sealing elements can be that the 2 separate sealing elements are capable of withstanding higher pressures that meet or exceed 1000 PSI. Another benefit of a sealing plug assembly having 2 separate sealing elements can be that an accidental leak in one sealing element does not completely compromise downstream workers because there is a redundant sealing element, upstream or downstream of the leaking sealing element, built into the sealing plug assembly.

Further, it was discovered that this design change leads to additional opportunities. It was noticed that when the sealing plug assembly was designed to include 2 (or more) sealing elements, then the sealing plug assembly traps or isolates product between the 2 separate sealing elements. It has been discovered that it is possible to design an isolation zone within the sealing plug assembly that can efficiently isolate the trapped product within the isolation zone so that the product can be removed or harvested by a bleed lance. In particular, it has been discovered that the nose piece of the sealing element assembly can be designed to have a channel or passage that operatively or fluidly connects the isolation zone between the sealing elements to a product port in the nose of the sealing plug assembly. Furthermore, by making the product port externally accessible on the outside of the nose piece, the product port can be accessed by drilling a hole into the pipe downstream of the sealing plug assembly and inserting a bleed lance into the product port so as to access and harvest the product from the isolation zone of the sealing plug assembly.

Once the product is removed from the isolation zone, the isolation zone can act as a further hindrance against leaking because the isolation zone creates a third barrier between upstream or proximal sealing element and the downstream or distal sealing element. For example, the isolation zone can be backfilled with a liquid, a gas, or vacuum. Further, if the fluid product were to leak from the upstream seal into the isolation zone between the 2 sealing elements, then with the isolation zone free of any product, there should be little or no pressure on the downstream sealing element (for a duration of the time it takes the leak in the upstream sealing element to fill the isolation zone). Also, the bleed lance can remain in position to monitor the isolation zone and reduce any pressure that may build up over time, or the bleed lance can be applied multiple times during an operation.

Going back to conventional sealing plugs, conventional sealing plugs typically contain a sealing element having a flat elastomeric surface. These conventional sealing elements typically require that the sealing plug be actively pressed against the interior surface of the pipe so as to firmly press and conform the surface of the sealing element against the interior of the pipe.

It has been discovered that a sealing element can be improved by forming a circular groove or circular depression into the elastomeric face of the sealing element at a distance that would be expected to protrude from the sealing element assembly but not so close to the edge of the sealing element that it would compromise or interfere with the ability of the outer edge of the sealing element to form a seal against the pipe interior. A sealing element having such a circular groove has been found to form seals more easily and more securely than a sealing element without such a circular groove. Without wishing to be bound by theory, it is believed that the circular groove and reduced thickness of the seal make the seal more forgiving as it enters the pipe and therefore it remains intact better to create the seal.

A sealing plug assembly, a bleed lance, a sealing element, and systems and methods for using the same are disclosed herein. An exemplary embodiment of the system for line stopping a pipe or pipeline containing a product is discussed below.

Figure 1B:
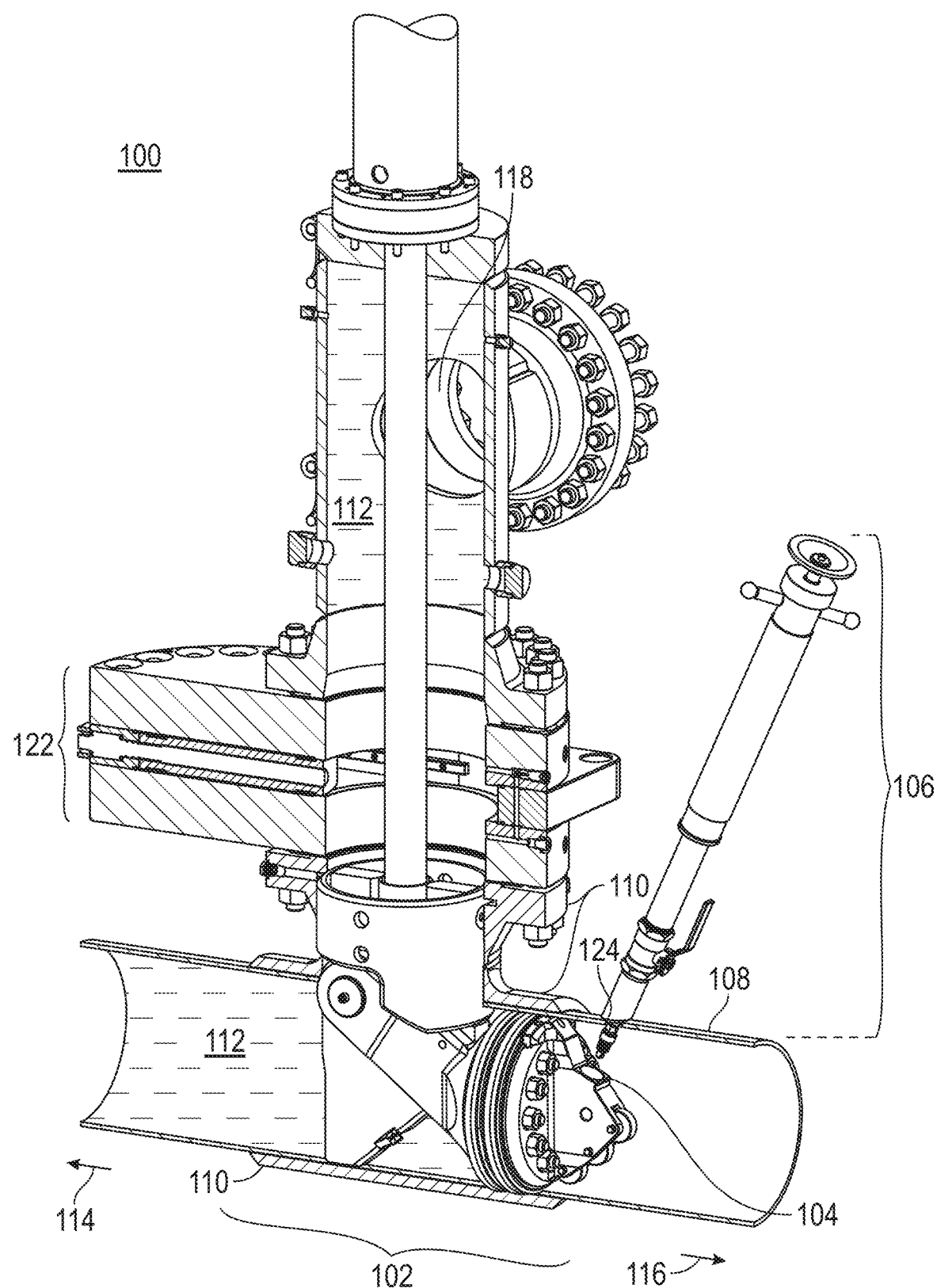
FIG. 1B shows a raised, off-axis cutaway view of the exemplary embodiment of the system from FIG. 1A, in accordance with embodiments of the present disclosure.

Referring to FIGS. 1A-1B, different views of the system (hereinafter, also referred to simply as "system") for stopping a pipe containing a liquid or gas product are shown during a line stop operation. In this embodiment, the system 100 includes a sealing plug assembly 102 having a product port 104 and a bleed lance 106. In more detail, FIG. 1A depicts a pipe 108 that has already had a split-T fitting 110 sealed around the pipe to access and pipe stop the flow of the product 112 from the upstream direction 114 to the downstream direction 116. As the flow of the product is stopped, the flow for the product can be diverted, as shown, from the upstream direction 114 to the downstream direction 116 of the pipe through a diversion outlet 118 located in the sealing plug housing 132. As shown in FIGS. 1A and 1B, in practice a line stop valve 122 positions the sealing plug housing over an opening of the split-T fitting so as to seal the opening together. In FIG. 1A, the sealing plug assembly is shown in the position of stopping or sealing the pipe. In practice, the sealing plug actuator 130 inserts the sealing plug assembly down into the pipe, sealing off the flow of product. Once the sealing plug assembly is in this position, then an opening 124 or hole can be opened downstream of the sealing plug assembly 102 for the insertion of a bleed lance 106 such that the bleed lance can be inserted into the product port 104 of the sealing plug assembly. As can be seen in FIG. 1A, the sealing plug assembly differs from traditional sealing plugs, in part, because it has 2 sealing elements, namely a proximal sealing element 126 and a distal sealing element 128, which both form a seal against the pipe.

Referring to FIG. 2A, the sealing plug assembly 202 is mounted on a control bar head 204 during operations. During insertion into the opening of the fitting and pipe, the sealing plug assembly and sealing plug housing are in an insertion mode or an extended orientation as shown in FIG. 2A. Once the nose piece 206 of the sealing plug assembly contacts the bottom of the pipe 232, then the sealing plug assembly pivots in a downstream direction into a sealing mode or contracted orientation as shown in FIG. 2B. During the sealing, the sealing plug assembly can trap product across a sealing length 230 between the two sealing elements, namely the proximal sealing element 226 and a distal sealing element 228. One or more nose wheels 208 can be positioned on the nose piece to facilitate this change in orientation. The change in orientation of the product port 210 as well as the proximal sealing element 226 and the distal sealing element 228 in both orientations is also shown.

Figure 3:
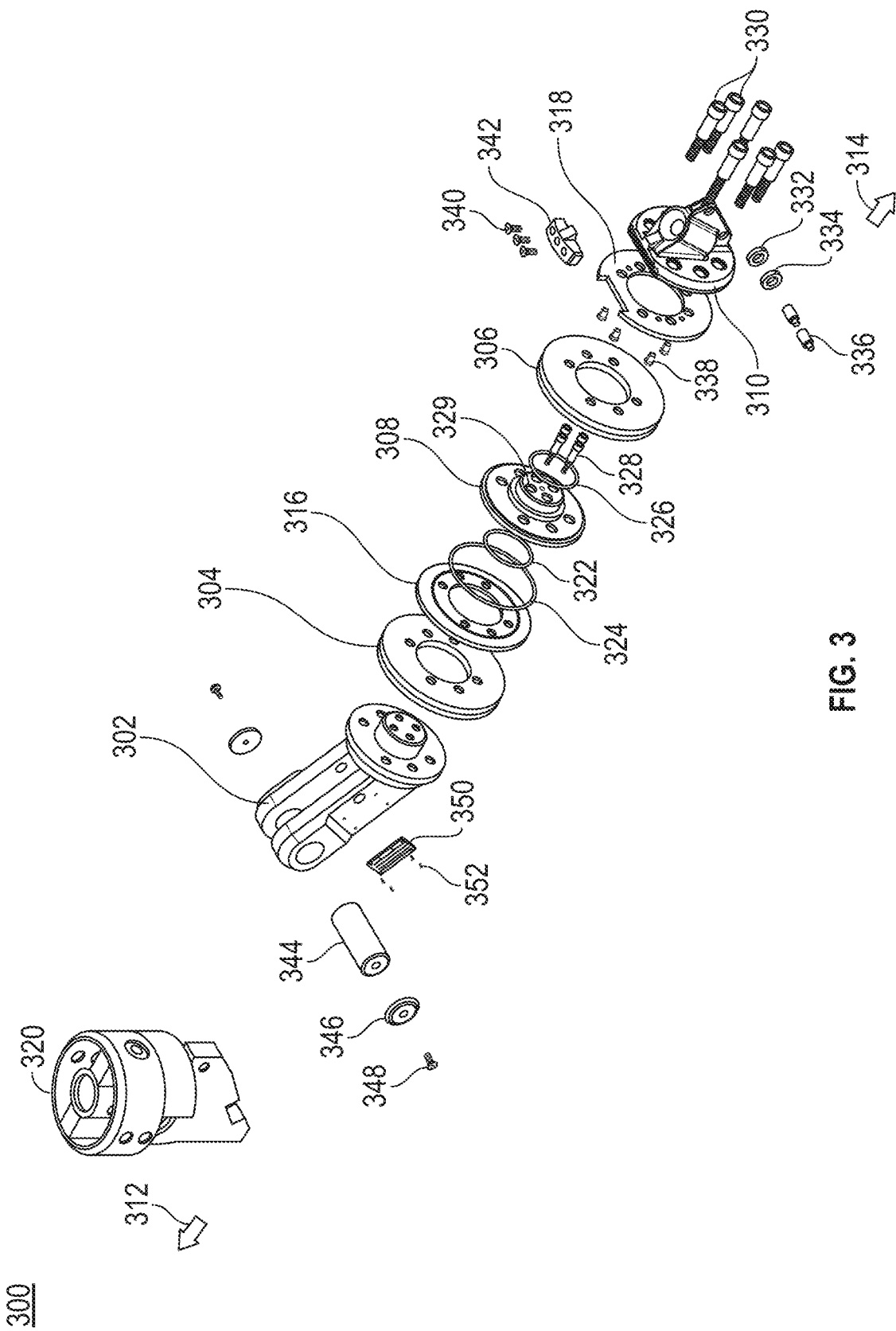
FIG. 3 shows an exploded diagram of the exemplary embodiment of the sealing plug assembly of FIGS. 2A-2B, in accordance with embodiments of the present disclosure.

FIG. 3 shows an exploded diagram of the sealing plug assembly. In this embodiment, the sealing plug assembly 300 includes a plugging head 302, a proximal sealing element 304, a distal sealing element 306, an isolation plate 308, and a nose piece 310. For frame of reference, the parts or components of the sealing plug assembly are generally referred to in relation to the plugging head such that the proximal direction 312 is in the direction closer to the plugging head, and the distal direction 314 is in the direction further from the plugging head.

In this embodiment, the sealing plug assembly also includes a proximal nose ring 316, a distal nose ring 318, and an isolation plate 308. In this embodiment, a portion of the plugging head directly contacts or is adjacent to the proximal sealing element and/or the isolation plate, a portion of the proximal sealing element directly contacts or is adjacent to the proximal nose ring, a portion of the proximal nose ring directly contacts or is adjacent to the isolation plate, a portion of the isolation plate directly contacts or is adjacent to the distal sealing element and/or the nose piece, a portion of the distal sealing element directly contacts or is adjacent to the distal nose ring, and the distal nose ring directly contacts or is adjacent to the nose piece.

In more detail, in this embodiment, the sealing plug assembly includes an inner proximal O-ring 322 and an outer proximal O-ring 324 between the proximal nose ring and the isolation plate. In this embodiment, the O-ring 322 seals between the plugging head 302 and isolation plate 308. In this embodiment, the sealing plug assembly includes a distal O-ring 326 between the isolation plate 308 and nose piece 310. In this embodiment, a plurality of inner bolts 328 pass through inner holes 329 in the isolation plate through a center of the proximal O-rings, the proximal nose ring, and the proximal sealing element, securing the isolation plate directly to the cylindrical raised portion of the plugging head 302. In this embodiment, the sealing plug assembly includes a plurality of outer bolts 330 that pass through holes in the nose piece, the distal nose ring, the distal sealing element, the isolation plate, the proximal nose ring, and the proximal sealing element, fastening these pieces to the plugging head. In this embodiment, the sealing plug assembly includes a top wheel 332 and a bottom wheel 334 secured into the nose piece by one or more wheel fastening means 336. In this embodiment, the sealing plug assembly includes a plurality of distal nose ring bolts 338 that fasten the distal nose ring directly to the nose piece. In this embodiment, a plurality of nose pad bolts 340 fasten the nose pad 342 directly onto the nose piece.

In this embodiment of the system, the plugging head 302 can be attached to the control bar head 320 about a pivot pin 344, wherein the pivot pin is secured into place by a pivot washer 346 and pivot bolt 348. In this embodiment, the sealing plug assembly can reversibly pivot from the extended orientation to the contracted orientation by rotating upon or around the pivot pin. In this embodiment, the sealing plug assembly includes a nameplate 350 attached by nameplate bolts 352 to a side of the plugging head.

Figure 4B:
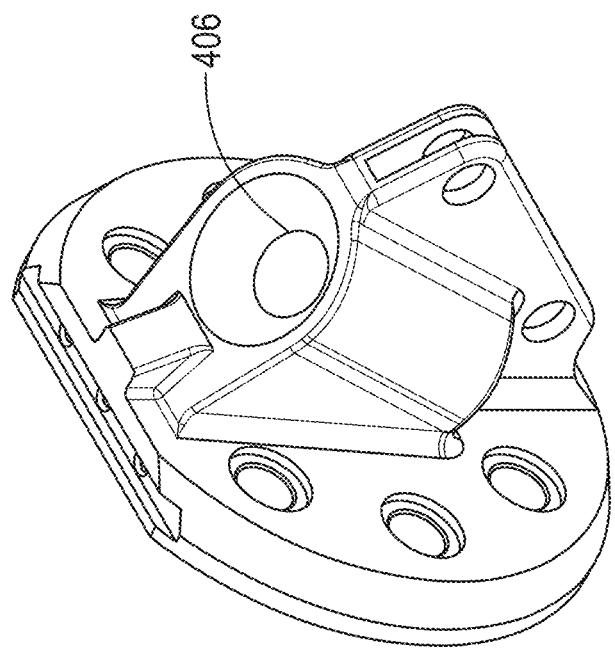
FIG. 4B shows a raised, off-axis view of the nose piece shown in FIG. 4A, in accordance with embodiments of the present disclosure.
Figure 4A:
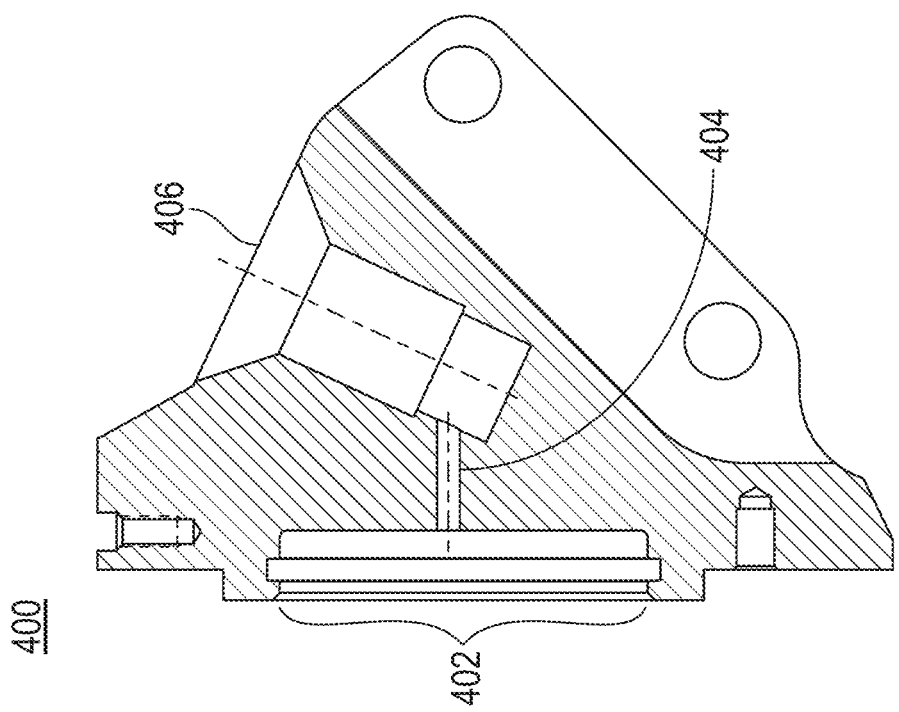
FIG. 4A shows a side cutaway view of an exemplary embodiment of a nose piece of the sealing plug assembly of FIGS. 2A and 2B, in accordance with embodiments of the present disclosure.

Referring to FIGS. 4A and 4B, the nose piece 400 is shown, wherein the nose piece has a portion of an isolation zone 402 that connects through a nose flow path 404 to the product port 406.

Referring to FIG. 5A, a rear view (elastomeric face) of a sealing element 500 is shown. In this embodiment of the sealing element, the sealing element has a clearance hole 502 in the center of the sealing element having an inner edge 504 and an outer edge 510. In this embodiment, between the inner edge and the outer edge are bolt holes 506 through the sealing element that are located at a distance from the center that places them outside of the inner edge, inside the outer edge, or both. In this embodiment, there is a circular groove 508 that is located closer to the outer edge and further from the center of the sealing element than the bolt holes. In this embodiment, the inner edge 504 is located at an inner radius distance 512 from the center of the sealing element, and the outer edge 510 is located at an outer radius distance 514 from the center of the sealing element, and the circular groove is located at a circular groove radius 516 from the center of the sealing element. In this embodiment, the circular groove radius is greater than the inner radius distance and less than the outer radius distance.

Referring to FIG. 5B, this embodiment of the sealing element includes an elastomeric face 532 and a flat face 530. In this embodiment of the sealing element, the inner edge of the sealing element has an inner edge axial thickness 518, the outer edge of the sealing element has an outer edge axial thickness 520, and the circular groove has a groove depth 522. In this embodiment of the sealing element, the circular groove is located at a radial distance 524 from the outer edge of the sealing element.

Figure 6B:
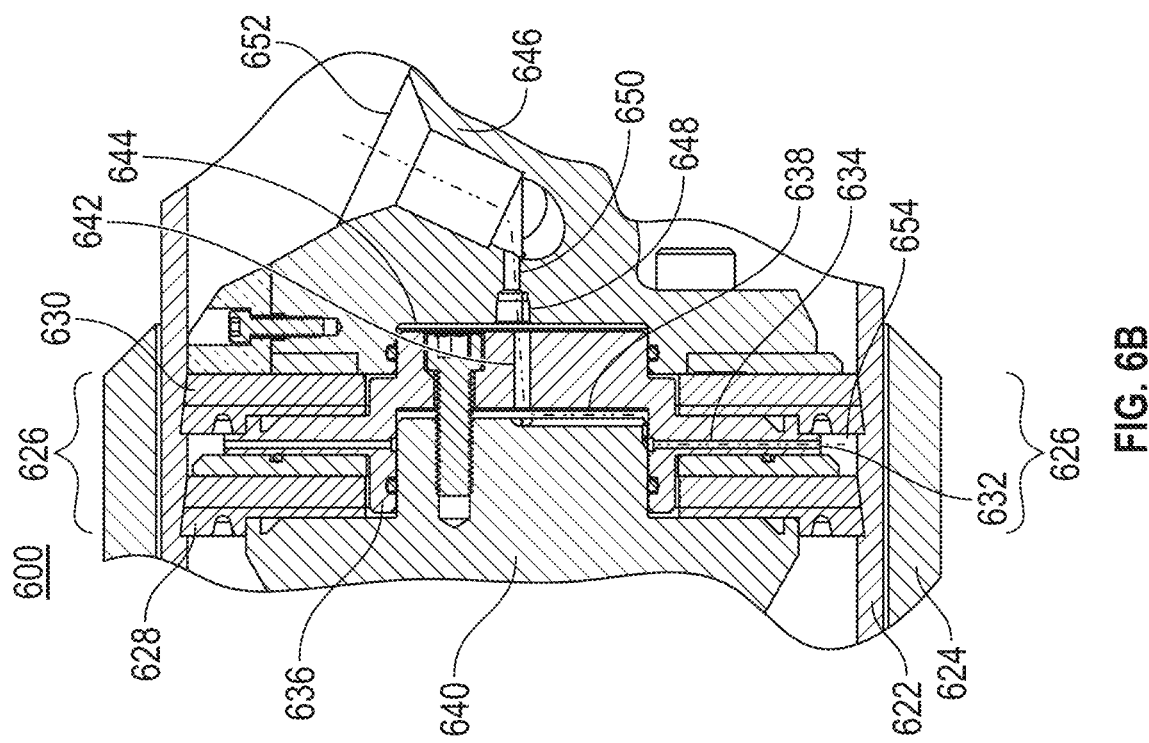
FIG. 6B shows a side cutaway view of an exemplary embodiment of the isolation zone within the sealing plug assembly of FIG. 2B, in accordance with embodiments of the present disclosure.
Figure 6A:
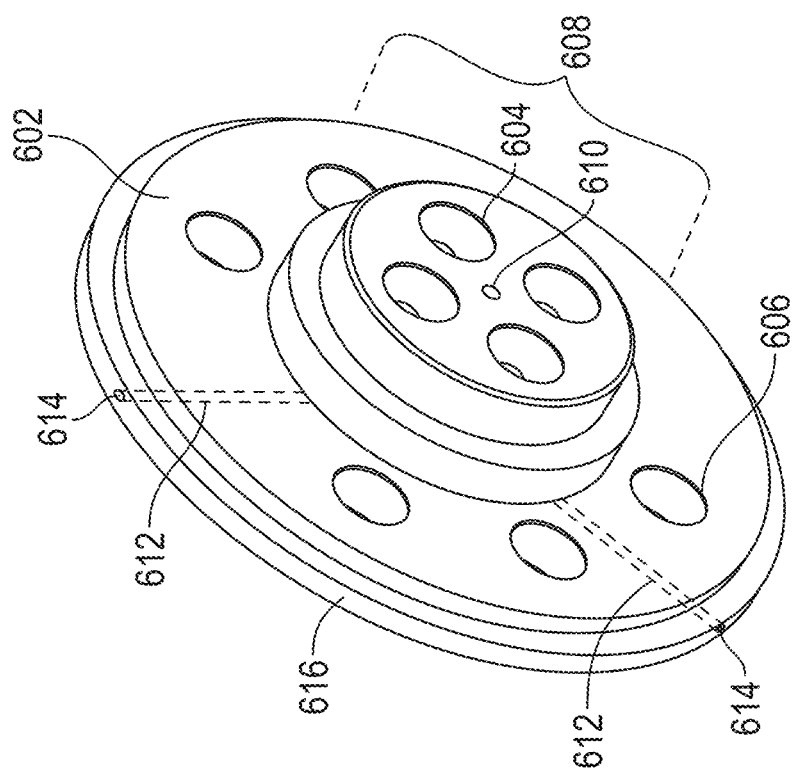
FIG. 6A shows a raised, off-axis view of the isolation plate of the sealing plug assembly of FIGS. 2A and 2B, in accordance with embodiments of the present disclosure.

Referring to FIG. 6A, an isolation plate 602 is shown, wherein the isolation plate has a plurality of inner bolt holes 604 and a plurality of outer bolt holes 606 and a cylindrical raised portion 608 in the center of the isolation plate. The isolation plate contains radial fluid pathways 612 that connect the isolation plate radial ports 614 located on the outer radial edge 616 of the isolation plate to a depression located under the cylindrical raised portion. The isolation plate contains an axial passage 610 through the center of the isolation plate and/or the center of the cylindrical raised portion.

Referring to FIG. 6B, in this embodiment, a connected fluid passageway can be found within the sealing plug assembly 600. When the sealing plug assembly has been inserted into a pipe 622, surrounded by the fitting 624, then product can be trapped along a sealing length 626 between the pipe and the proximal sealing element 628 and the distal sealing element 630. The product trapped along the sealing length can flow into an isolation plate radial port 632 and through a radial fluid pathway 634 located in the isolation plate 636 to a proximal isolation zone 638, located between the isolation plate the plugging head 640. The proximal isolation zone connects an axial passage 642 to a distal isolation zone 644, wherein the distal isolation zone is located between the isolation plate and the nose piece 646. The distal isolation zone is connected by a nose piece opening 648 of the nose piece, wherein the nose piece opening connects through a nose flow path 650 to the product port 652. Thus, the connected fluid passageways of the sealing plug assembly can allow for a product trapped in an axial isolation zone 654, formed between the pipe and the two sealing elements, to flow through the sealing plug assembly to the product port of the nose piece.

In some embodiments, trapped product can flow, in series, from the axial isolation zone through the radial fluid pathways, from the radial fluid pathways through the proximal isolation zone, from the proximal isolation zone through the axial passage, from the axial passage through the distal isolation zone, from the distal isolation zone through the nose flow path and from the nose flow path to the product port. In this embodiment, the aggregate volume of the axial isolation zone, the radial fluid pathways, the proximal isolation zone, the distal isolation zone, and the nose flow path form an isolation zone having an isolation zone volume.

Figure 7A:
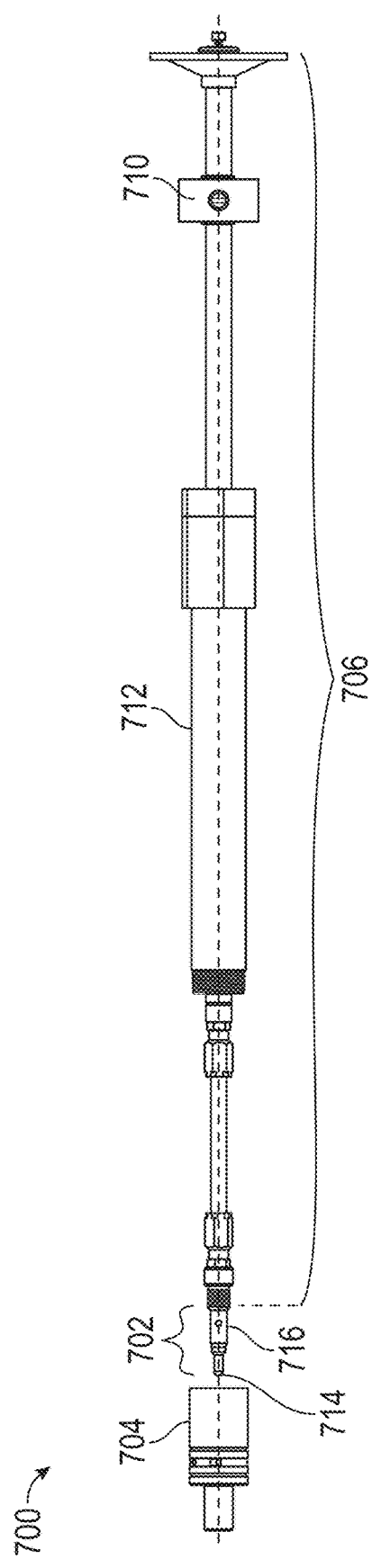
FIG. 7A shows a side view of an exemplary embodiment of the bleed lance, in accordance with embodiments of the present disclosure.
Figure 7B:
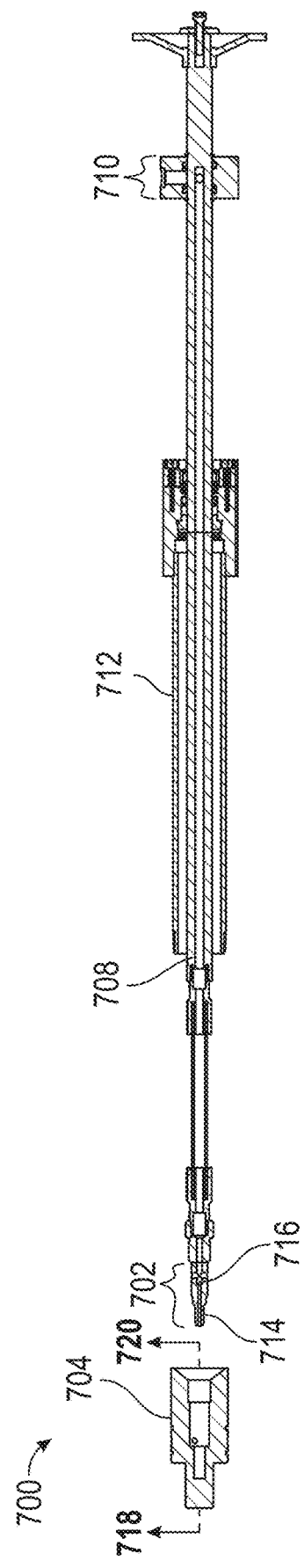
FIG. 7B shows a side cutaway view of the bleed lance of FIG. 7A, in accordance with embodiments of the present disclosure.
Figure 8:
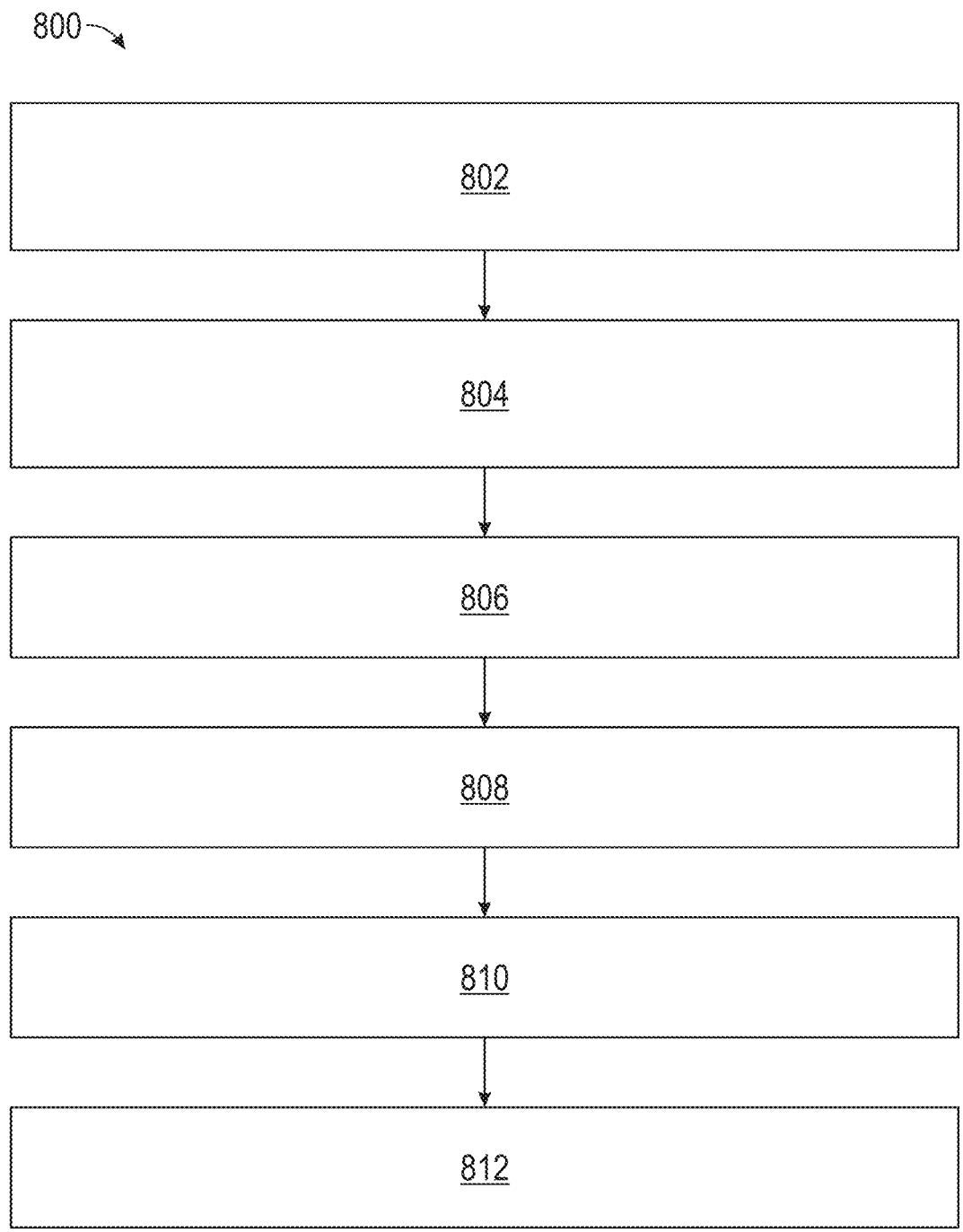
FIG. 8 is a method flow diagram for an exemplary embodiment of a method of stopping a pipe containing a product, in accordance with embodiments of the present disclosure.

FIGS. 7A and 7B illustrate different views of the bleed lance 700 for draining an isolation zone of the sealing plug assembly. The bleed lance 700 includes a stab inlet 702, a body 712, and a bleed lance exit 710. The body 712 includes a hollow pipe or tube, and the body is connected to the stab inlet 702 and the bleed lance exit 710 by a lance flow pathway 708. The stab inlet 702 can include a stab inlet opening 714 located on a stab inlet exterior. The stab exterior can have a shape complimentary to, referring to FIGS. 4A-4B, the product port 406, or an interior surface of the product port, provided on the nose piece 400 of a sealing plug assembly. Referring to FIGS. 7A and 7B, the body 712 can be made of a rigid material to facilitate insertion of the bleed lance 700, referring to FIG. 1A, into the pipe 108 to access the product port 104.

As can be understood by those skilled in the art, the length of the body 706 can be based on the size of pipe 108 to be accessed. In exemplary implementations, the body length can be in a range of 5.0 cm to 750.0 cm, including in a range of from about 10.0 cm to about 500.0 cm. An internal diameter of the body 712 can be in a range from 2.5 cm to 10.0 cm, including a range from about 0.5 cm to about 5.0 cm.

In some embodiments, the bleed lance 700 can include a stab inlet adaptor 704 configured such that a top end 720 of the stab inlet adapter can engage with an exterior of the stab inlet, such as by having a shape complementary to the exterior of the stab inlet. A bottom end 718 of the stab inlet adaptor 704 can be configured to fit, referring to FIG. 1A, the product port 104 on a nose piece 400, such as by having a shape complementary to the product port 406.

In some embodiments, the stab inlet 702 can include a pin 716 protruding from the exterior surface. The pin 716 can have the functionality of opening or closing the product port to allowing flow of the product from the product port 406 into the lance flow pathway 708. In some embodiments, the stab inlet 702 does not include or can exclude a pin 716 protruding from the exterior surface and the product port can remain open and accessible.

Another exemplary embodiment of a sealing plug assembly that can be used in the system for line stopping a pipe or pipeline containing a product shown in FIGS. 1A and 1B is shown in FIGS. 9-14.

Referring to FIG. 9A, the sealing plug assembly 902 is mounted on a control bar head 904 during operations. During insertion into the opening of the fitting and pipe, the sealing plug assembly and sealing plug housing are in an insertion mode or an extended orientation as shown in FIG. 9A. Once the nose piece 906 of the sealing plug assembly contacts the bottom of the pipe, then the sealing plug assembly pivots in a downstream direction into a sealing mode or contracted orientation as shown in FIG. 9B. The sealing mode can trap product across a sealing length 930 between two sealing elements, namely the proximal sealing element 926 and the distal sealing element 928. One or more nose wheels 908 can be positioned on the nose piece to facilitate this change in orientation. The change in orientation of the product port 910 as well as the proximal sealing element 926 and the distal sealing element 928 in both orientations is also shown.

Figure 10:
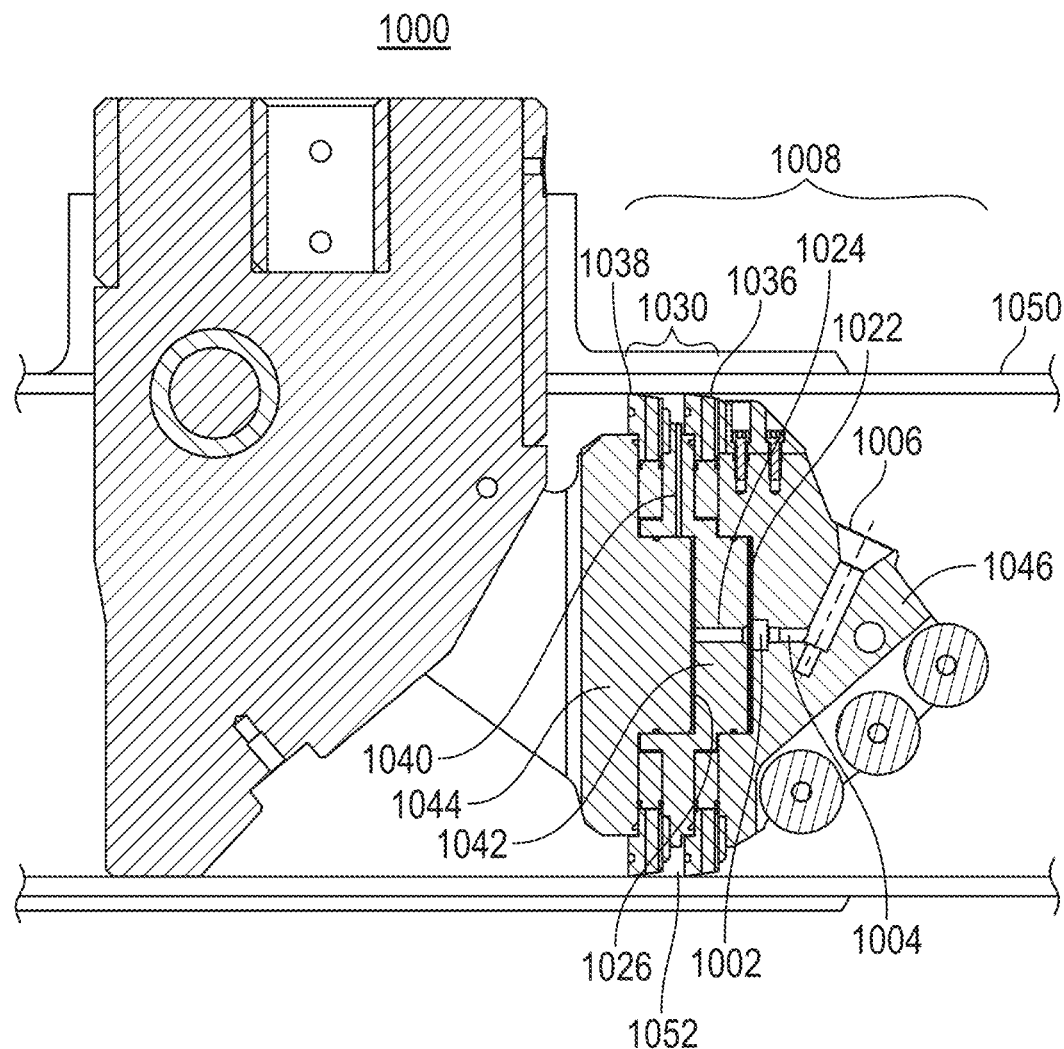

Referring to FIG. 10, connected fluid passageways 1008 can be found within the sealing plug assembly. When the sealing plug assembly 1000 has been inserted into a pipe 1050, then product can be trapped along a sealing length 1030 between the pipe and the proximal sealing element 1036 and the distal sealing element 1038. The product trapped along the sealing length can flow through a radial fluid pathway 1040 located in the isolation plate 1042 to proximal isolation zone 1026, located between the isolation plate and the plugging head 1044. The proximal isolation zone connects to an axial passage 1024 to a distal isolation zone 1022, wherein the distal isolation zone is located between the isolation plate 1042 and the nose piece 1046. The distal isolation zone is connected by a nose piece opening 1002 of the nose piece 1046, wherein the nose piece opening connects through a nose flow path 1004 to the product port 1006. Thus, the connected fluid passageways of the sealing plug assembly can allow for a product trapped in an axial isolation zone 1052, formed between the pipe and the two sealing elements, to flow through the sealing plug assembly to the product port of the nose piece.

In some embodiments, trapped product can flow, in series, from the axial isolation zone through the radial fluid pathways, from the radial fluid pathways through the proximal isolation zone, from the proximal isolation zone through the axial passage, from the axial passage through the distal isolation zone, from the distal isolation zone through the nose flow path and from the nose flow path to the product port. In this embodiment, the aggregate volume of the axial isolation zone, the radial fluid pathways, the proximal isolation zone, the distal isolation zone, and the nose flow path forms an isolation zone having an isolation zone volume.

Figure 11A:
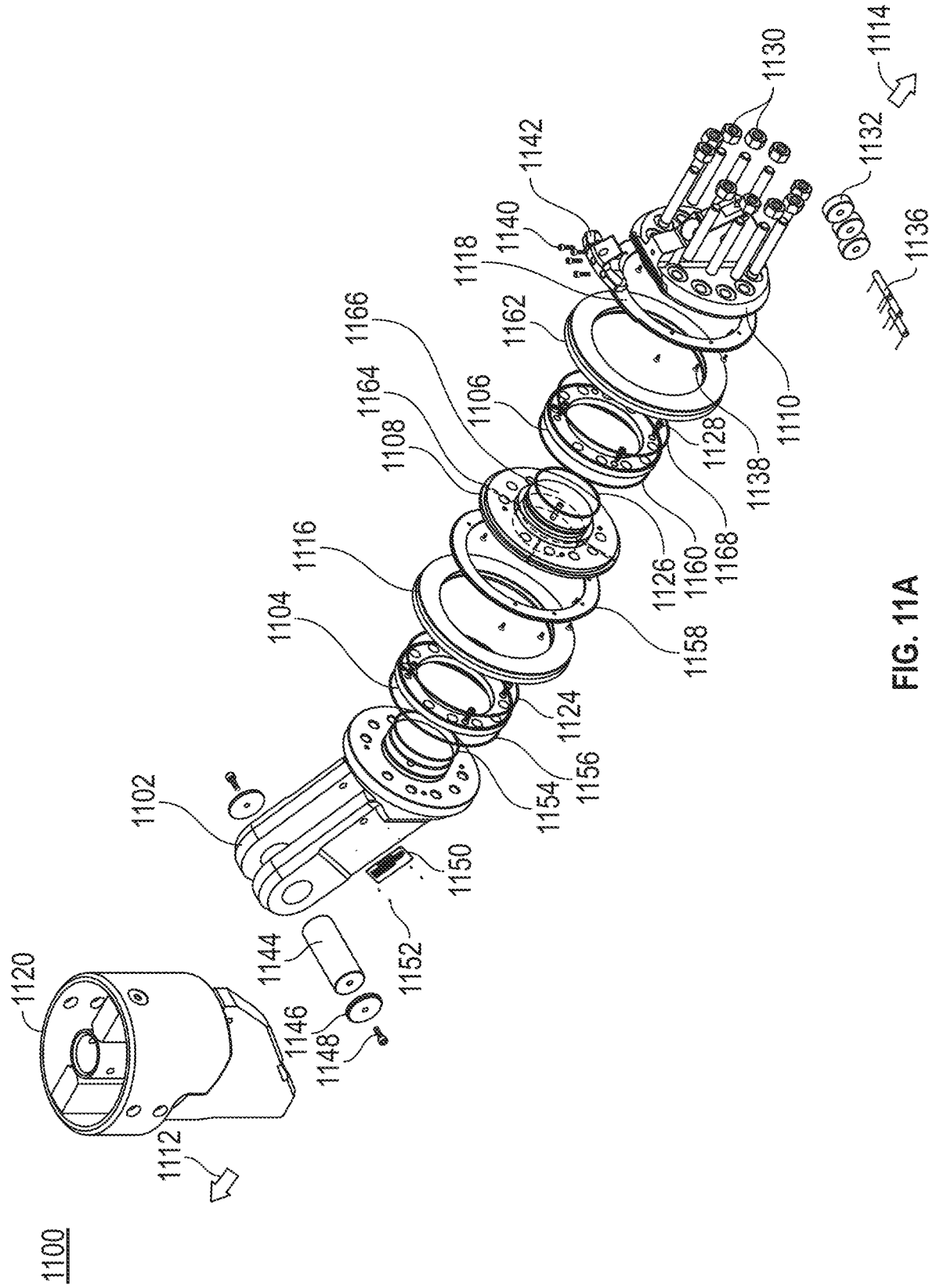
FIG. 11A shows an exploded diagram of the exemplary embodiment of the sealing plug assembly of FIGS. 9A, 9B, and 10, in accordance with embodiments of the present disclosure.
Figure 11B:
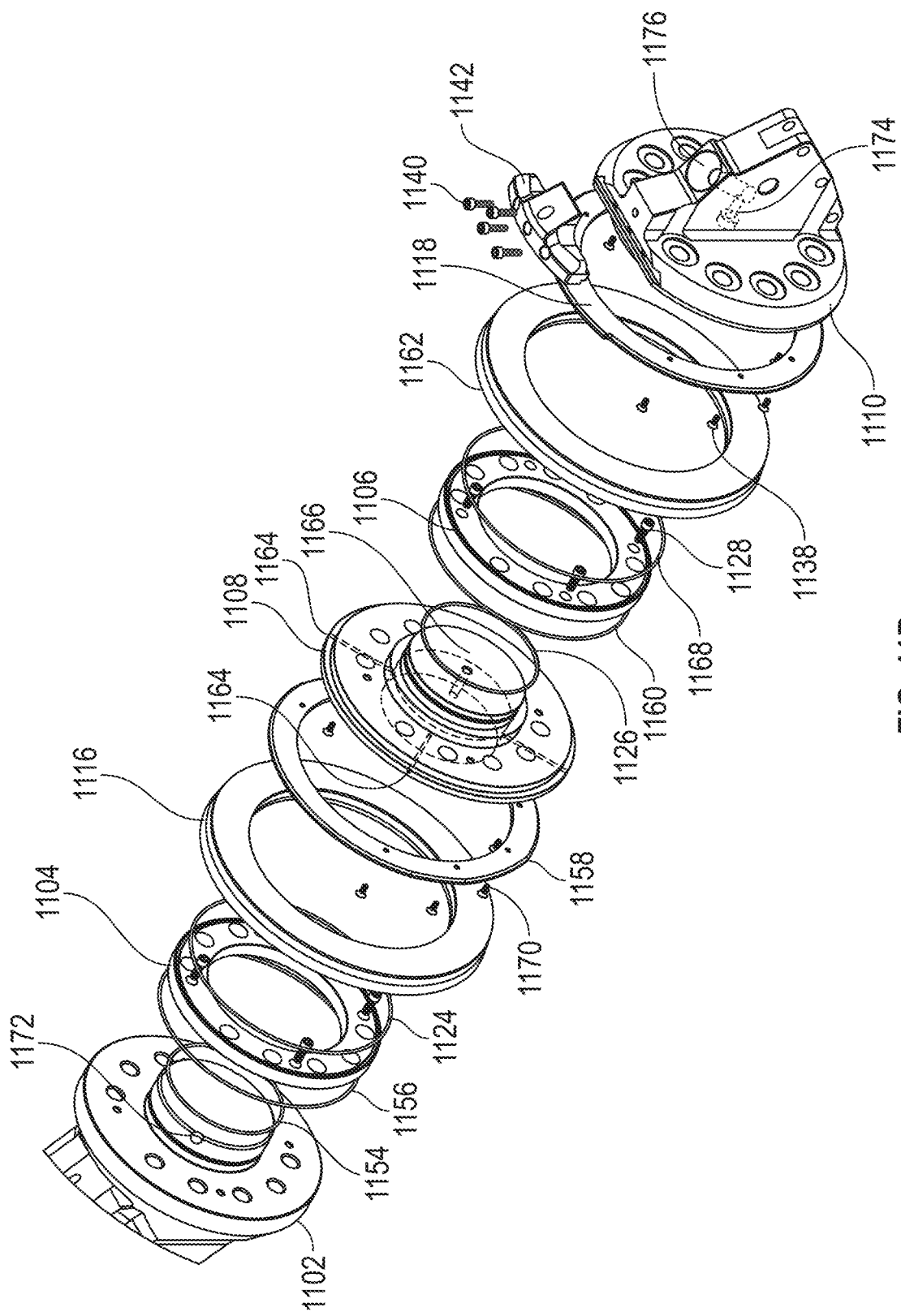
FIG. 11B shows an exploded diagram of the exemplary embodiment of the sealing plug assembly of 11A.

FIGS. 11A and 11B show an exploded diagram of a sealing plug assembly according to embodiments disclosed herein. In this embodiment, the sealing plug assembly 1100 includes a plugging head 1102, a proximal sealing element 1116, an isolation plate 1108, a distal sealing element 1162, and a nose piece 1110. For frame of reference, the parts or components of the sealing plug assembly are generally referred to in relation to the plugging head such that the proximal direction 1112 is in the direction closer to the plugging head, whereas the distal direction 1114 is in the direction further from the plugging head.

In this embodiment, the sealing plug assembly also includes a proximal isolation ring 1104, a proximal nose ring 1158, distal isolation ring 1106, and a distal nose ring 1118. In this embodiment, a portion of the plugging head directly contacts or is adjacent to the proximal isolation ring and/or the isolation plate, a portion of the proximal isolation ring directly contacts or is adjacent to the proximal sealing element, a portion of the proximal sealing element directly contacts or is adjacent to the proximal nose ring, the proximal nose ring directly contacts or is adjacent to a portion of the isolation plate, a portion of the isolation plate directly contacts or is adjacent to the distal isolation ring and/or the nose piece, a portion of the distal isolation ring directly contacts or is adjacent to the distal sealing element, a portion of the distal sealing element directly contacts or is adjacent to the distal nose ring, and a portion of the distal nose ring directly contacts or is adjacent to the nose piece.

In more detail, in this embodiment of the system, the plugging head 1102 can be attached to the control bar head 1120 about a pivot pin 1144, wherein the pivot pin is secured into place by a pivot washer 1146 and pivot bolt 1148. In this embodiment, the sealing plug assembly can reversibly pivot from the extended orientation to the contracted orientation by rotating upon or around the pivot pin. In this embodiment, the sealing plug assembly includes a nameplate 1150 attached by nameplate bolts 1152 to a side of the plugging head.

In this embodiment, when assembled, the sealing plug assembly includes a plurality of outer bolts 1130 that pass through holes in the nose piece through the isolation plate into the plugging head, fastening the nose piece and the isolation plate to the plugging head along with fastening together the various layers located between nose piece, the isolation plate, and plugging head.

In this embodiment, the sealing plug assembly includes one or more nose wheels 1132 secured into the nose piece by one or more wheel fastening pins 1136. In this embodiment, a plurality of nose pad bolts 1140 fasten the nose pad 1142 directly onto the nose piece.

In this embodiment, the sealing plug assembly includes multiple O-rings to seal one component to another. In this embodiment, a portion of the plugging head is sealed to the isolation plate by an inner proximal O-ring 1154, a portion of the plugging head is sealed to the proximal isolation ring by an outer proximal O-ring 1156, a portion of the proximal isolation ring is sealed to the isolation plate by proximal O-ring 1124. In this embodiment, a portion of the isolation plate is sealed to the nose piece by an inner distal O-ring 1126, a portion of the isolation plate is sealed distal isolation ring by outer distal O-ring 1160, and a portion of the distal isolation ring is sealed to the nose piece by distal O-ring 1168.

In this embodiment, the sealing plug assembly includes multiple bolts to fasten one component to another. In this embodiment, referring to FIG. 11B, a portion of the proximal nose ring is fastened to the isolation plate by proximal nose ring bolts 1170, a portion of the distal isolation ring is fastened to the isolation plate by one or more distal isolation ring bolts 1128, a portion of the distal nose ring is fastened to the nose piece by one or more distal nose ring bolts 1138.

In this embodiment, referring to FIG. 11B, one or more radial fluid pathways 1164 can be seen connected to the axial passage 1166, which will further connect with the nose flow path 1174, which in turn is connected to the product port 1176. In an embodiment, an alignment indention 1172 cuts into the surface of the raised surface of the plugging head 1102 to help connect the various ports of the sealing plug assembly.

In an embodiment, referring to FIGS. 12A (side view) and 12B (top view), the sealing plug assembly 1200 is formed by fastening outer 1231 bolts through the nose piece 1230, then through the isolation plate 1232 into the plugging head 1234, which positions the isolation plate between the proximal sealing element 1238 and the distal sealing element 1236. The proximal sealing element 1238 and the distal sealing element 1236 extend or protrude a length beyond the surface of the sealing plug assembly, such that they are able to form a seal with a pipe upon insertion into a pipe. The sealing of the proximal sealing element 1238 and the distal sealing element 1236 to the pipe can trap a product along a sealing length 1220. The product trapped along the sealing length can flow through a radial fluid pathway 1228 in the isolation plate 1232 to a proximal isolation zone 1226, located between the isolation plate 1232 and the plugging head 1234. The proximal isolation zone connects to an axial passage 1224 to a distal isolation zone 1222, wherein the distal isolation zone 1222, which is located between the isolation plate 1232 and the nose piece 1230. The distal isolation zone is connected to the nose piece opening 1202 of the nose piece 1230, wherein the nose piece opening connects through a nose flow path 1204 to the product port 1206.

Referring to 12B magnification 1208, the proximal isolation ring 1240 has O-ring face seals on each face that allow for the outer proximal O-ring 1242 and the proximal O-ring 1246 to be held rigidly in place to seal the proximal isolation ring to the plugging head and isolation plate, respectively. These seals of the proximal isolation ring are located closer to the center of the sealing plug assembly than the raised elastomeric ring 1248 of the proximal sealing element. Similarly, referring to 12B magnification 1209, the distal isolation ring 1250 has O-ring face seals on each face that allow for the outer distal O-ring 1252 and the distal O-ring 1256 to be held rigidly in place to seal the distal isolation ring to the isolation plate and the nose piece, respectively. These seals of the distal isolation ring are located closer to the center of the sealing plug assembly than the raised elastomeric ring 1258 of the distal sealing element.

A benefit of the isolation rings can include improved leak resistance at higher pressures. For example, when relying on just the raised elastomeric ring on the backside of the sealing element as the only means to seal product from leaking out the bolt holes, it has been noticed that leaks can occur. It is believed that higher pressures tend to cause the contact pressure of the raised elastomeric ring to decrease, causing leaks. A benefit of the isolation rings can include positioning an intermediary set of seals between the bolt holes and the raised elastomeric ring of the sealing elements. Also, the intermediary set of seals includes conventional O-ring face seals within rigid or metallic grooves. It is believed that the rigidness of the isolation ring is helpful because it allows for a high amount of preload to be applied with the nose bolts before any separation of the O-ring gland will occur, so this arrangement maintains consistent compression on the O-ring even at high pressures.

In an embodiment, referring to FIGS. 13A and 13B, a rear view (elastomeric face) of a sealing element 1300 is shown. In this embodiment of the sealing element, the sealing element has a clearance hole 1302 in the center of the sealing element having an inner edge 1304 and an outer edge 1310. In this embodiment, bolt holes between the inner edge and the outer edge are excluded. In this embodiment, there is a circular groove 1308 that is located on the elastomeric face 1332 between the inner edge and the outer edge of the sealing element. In this embodiment, the inner edge is located at an inner radius distance 1312 from the center of the sealing element, and the outer edge is located at an outer radius distance 1314 from the center of the sealing element, and the circular groove is located at a circular groove radius 1316 from the center of the sealing element. In this embodiment, the circular groove radius is greater than the inner radius distance and less than the outer radius distance. In this embodiment of the sealing element, the circular groove is located at a radial distance 1324 from the outer edge of the sealing element.

Referring to FIG. 13B, this embodiment of the sealing element includes an elastomeric face 1332 and a fabric layer 1330. In this embodiment of the sealing element, the inner edge of the sealing element has an inner edge axial thickness 1318, the outer edge of the sealing element has an outer edge axial thickness 1320, and the circular groove has a groove depth 1322. In this embodiment of the sealing element, the circular groove is located at a radial distance 1324 from the outer edge of the sealing element. Further, the sealing element has a rubber layer 1326 on at least a portion of the fabric layer 1330.

Figure 13D:
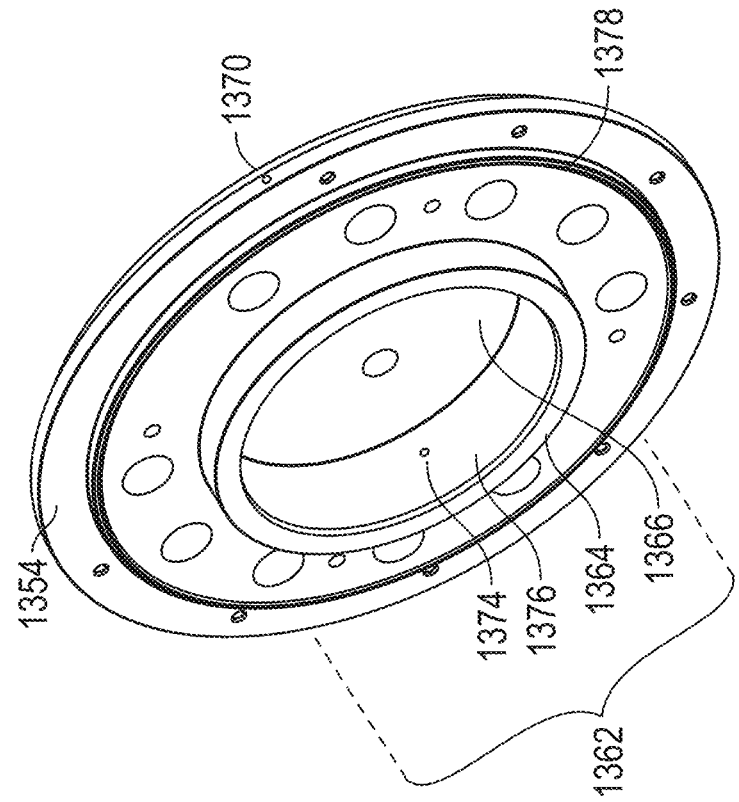
FIG. 13D shows a posterior off-axis view of the isolation plate shown in FIG. 13C, in accordance with embodiments of the present disclosure.
Figure 13C:
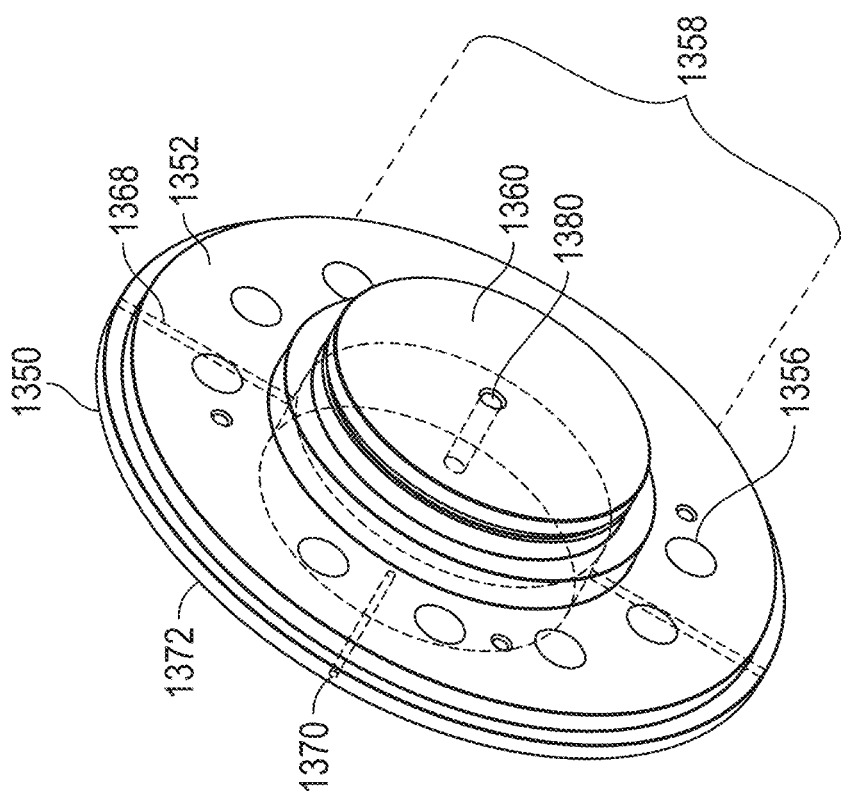
FIG. 13C shows a frontal off-axis view of the isolation plate of the sealing plug assembly of FIG. 9A, in accordance with embodiments of the present disclosure.

Referring to FIGS. 13C and 13D, an isolation plate 1350 is shown, wherein the isolation plate has a distal side 1352 and a proximal side 1354. The isolation plate has a plurality of bolt holes 1356 and a cylindrical raised portion 1358 in the center of the isolation plate on the distal side of the isolation plate, wherein the cylindrical raised portion has a circular flat top 1360. The isolation plate has a cylindrical depression 1362 underneath the cylindrical raised portion on the proximal side of the isolation plate, wherein the cylindrical depressed portion is surrounded by a raised inner isolation plate ring 1364, wherein the cylindrical depression has a circular flat bottom 1366, and wherein the cylindrical depression of the isolation plate has a shape that complements the cylindrical raised portion of the plugging head. The isolation plate contains radial fluid pathways 1368 that connect isolation plate radial ports 1370, located on the outer radial edge 1372 of the isolation plate, to isolation zone ports 1374, located on an inner surface of the cylindrical depression 1376. The purpose of the radial fluid pathways is to fluidly connect the outer radial edge 1372 to inner surface of the cylindrical depression 1376 of the isolation plate. In this embodiment, the proximal side of the isolation plate has a raised outer isolation plate ring 1378 that is coaxial with the center axis of the sealing plug assembly and closer to the outer radial edge than the plurality of bolt holes. In this embodiment, the proximal side of the isolation plate has a raised inner isolation plate ring 1364 that is coaxial with the center axis of the sealing plug assembly and closer to the center or axis of isolation plate than the plurality of bolt holes. The isolation plate has an axial passage 1380 passing through the center or axis of the isolation plate.

In some embodiments, when the sealing plug assembly is assembled, then the raised outer isolation plate ring 1378 protrudes out from the surface of the proximal face of the isolation plate to press against, referring to FIGS. 13B and 12A, the rubber layer 1326 of the proximal sealing element 1238. A benefit of the raised isolation plate ring protruding against the rubber side of the proximal sealing element can be that as the differential pressure increases across the sealing element, the contact pressure between the rubber face of the proximal sealing element and the isolation plate increases, which improves the seal for higher pressures.

Figure 14B:
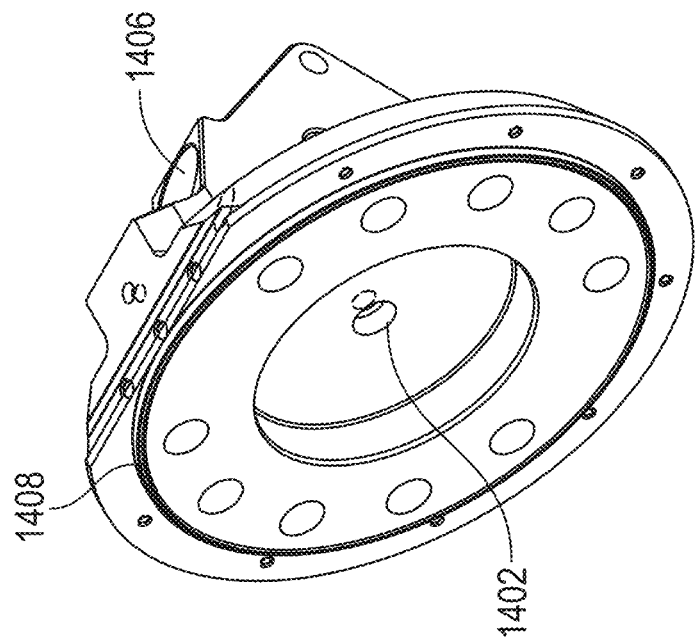
FIG. 14B shows a posterior off-axis view of the nose piece of FIG. 14A, in accordance with embodiments of the present disclosure.
Figure 14A:
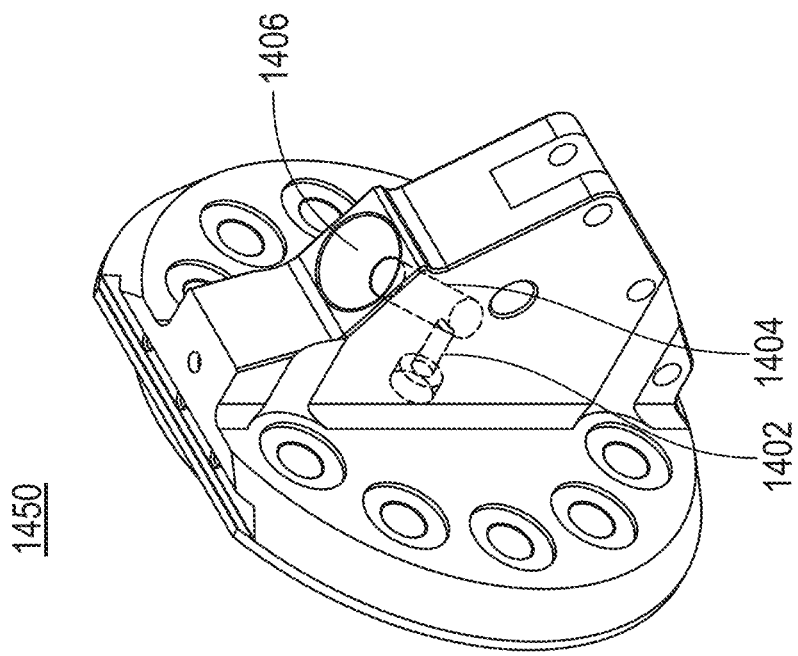
FIG. 14A shows a frontal off-axis view of the nose piece of the sealing plug assembly of FIG. 9A, in accordance with embodiments of the present disclosure.

Referring to FIGS. 14A and 14B, the nose piece 1450 is shown, wherein the nose piece has a nose piece opening 1402 that connects through a nose flow path 1404 to the product port 1406. The proximal side of the nose piece also has a raised nose piece ring 1408 that is coaxial with the center axis of the sealing plug assembly.

In some embodiments, when the sealing plug assembly is assembled, the raised nose piece ring 1408 protrudes out from the surface of the proximal face of the nose piece 1450 to press against, referring to FIGS. 13B and 12A, respectively, the rubber layer 1326 of the distal sealing element 1236. A benefit of the raised nose piece ring protruding against the rubber side of the distal sealing element can be that as the differential pressure increases across the sealing element, the contact pressure between the rubber face of the proximal sealing element and the nose piece increases, which improves the seal for higher pressures.

Having discussed the parts of the system above, the system is discussed in more detail below.

The present disclosure provides a sealing plug assembly. In some embodiments, the disclosed sealing plug assembly comprises: a plugging head, a proximal sealing element, a distal sealing element, an isolation plate, and a nose piece. In some embodiments, the proximal sealing element is located closer to the plugging head than the distal sealing element. In some embodiments, the proximal sealing element protrudes around an exterior of the sealing plug assembly. In some embodiments, the distal sealing element is located closer to the nose piece than the proximal sealing element. In some embodiments, the distal sealing element protrudes around the exterior of the sealing plug assembly. In some embodiments, the isolation plate is contained in an interior of the sealing plug assembly. In some embodiments, the isolation plate is located between the proximal sealing element and the distal sealing element. In some embodiments, the sealing plug assembly includes: two or more sealing elements, an isolation plate, and a nose piece, wherein the nose piece can contain a product port or exclude a product port. In some embodiments, the disclosed sealing plug assembly comprises: a plugging head, two or more sealing elements, an isolation plate, and a nose piece, wherein the nose piece can contain or exclude a product port.

In some embodiments, the isolation plate is discoidal and has a distal surface having a raised cylindrical shape with a circular flat top, wherein the circular flat top has a center that is coaxial with the sealing plug assembly. In some embodiments, the isolation plate has a proximal surface having a raised inner isolation plate ring that is coaxial with the center or axis of the isolation plate and surrounds a depressed cylindrical shape having a circular flat bottom, wherein the depressed cylindrical shape has a shape that is complementary to the raised cylindrical shape of the distal surface of the isolation plate, or complementary to the raised cylindrical shape of the plugging head, or wherein circular flat bottom has a center that is coaxial with the sealing plug assembly, or a combination thereof. In some embodiments, the isolation plate has a raised cylindrical height of from about 1.8 cm to about 10.2 cm, as measured from the bottom of the raised cylindrical shape to the circular flat top of the cylindrical shape. In some embodiments, the isolation plate has a depressed cylindrical depth of from about 1.8 cm to about 10.2 cm, as measured from the proximal surface of the isolation plate to the circular flat bottom of the depressed cylindrical shape, or about 3.2 cm to about 40.4 cm as measured from the top of the raised inner isolation plate ring to the circular flat bottom of the depressed cylindrical shape, or a combination thereof.

In some embodiments, the isolation plate has an axial passage that connects the distal raised cylindrical shape or distal surface of the isolation plate to the proximal depressed cylindrical shape or proximal surface of the isolation plate. In some embodiments, the axial passage has a center or axis that is co-axial with the sealing plug assembly. In some embodiments, the isolation plate has an outer radial edge and an inner radial edge located inside of the depressed cylindrical shape of the proximal surface of the isolation plate. In some embodiments, the isolation plate has one or more, or 2, 3, 4, 5, 6, 7, 8, 9, 10, 11, 12, 13, 14, 15, or 16, isolation plate radial ports located around the outer radial edge of the isolation plate, each or most of which are connected by a radial fluid pathway to a corresponding number of isolation zone ports located along the inner radial edge of the depressed cylindrical shape of the proximal surface of the isolation plate. A benefit of the isolation plate can be to act as a spacer between the proximal sealing element and the distal sealing element as well as between the plugging head and the nose piece. Another benefit of the isolation plate can be to provide radial fluid pathways and an axial passage that connect or fluidly connect the axial isolation zone to the nose flow path of the nose piece, allowing a fluid to flow from the axial isolation zone to the nose flow path of the nose piece.

In some embodiments, the sealing plug assembly can form a network of connected fluid passageways that connect or fluidly connect an axial isolation zone located between the proximal sealing element, the distal sealing element, the outer radial edge of the isolation plate, and an inner surface of a pipe into which the sealing plug assembly has been inserted. In some embodiments, the network of connected fluid passageways includes an axial isolation zone (sometimes simply referred to as an "isolation zone" or the "main isolation zone"), a proximal isolation zone, a distal isolation zone, an axial passage, and a nose piece flow path. In some embodiments, the proximal isolation zone is located between and bounded by the proximal surface of the isolation plate and the raised surface of the plugging head. In some embodiments, the distal isolation zone is located between and bounded by the distal surface of the isolation plate and the proximal surface of the nose piece. In some embodiments, the axial isolation zone is connected or fluidly connected to the proximal isolation zone by one or more radial fluid passageways. In some embodiments, the proximal isolation zone is connected or fluidly connected to the distal isolation zone by the axial passage of the isolation plate. In some embodiments, the distal isolation zone is connected or fluidly connected to the product port by a nose flow path. When assembled and sealed into a pipe, some embodiments of the sealing plug assembly can flow a product from the axial isolation zone through the radial passageways to the proximal isolation zone, from the proximal isolation zone through the axial passage to the distal isolation zone, from the distal isolation zone to the product port through the nose flow path.

In some embodiments, the product port in the nose piece is operatively or fluidically coupled to an isolation zone located around or behind or proximal to the isolation plate and between the proximal sealing element and the distal sealing element, such that, when the bleed lance is coupled to the nose piece, and optionally actuated, the product trapped or isolated in the isolation zone between the proximal sealing element and the distal sealing element can be drained or extracted by the bleed lance through the nose piece. In some embodiments, the isolation plate is located between the proximal sealing element and the distal sealing element, and the isolation plate connects or fluidly connects the isolation zone or axial isolation zone between the proximal sealing element and the distal sealing element to the nose piece.

In some embodiments, the plugging head is pivotally coupled to a sealing plug housing by a pivot pin. In some embodiments, pivot pin enables the sealing plug assembly to transition from the insertion mode or extended orientation of FIG. 2A to the sealing mode or contracted orientation of FIG. 2B, when the sealing plug assembly is pushed down by the sealing plug housing. In some embodiments, the plugging head, in the insertion mode of the sealing plug assembly, can be in alignment with the sealing plug housing, whereas in the sealing mode, the plugging head can be perpendicular to the sealing plug housing, such that the proximal and distal sealing elements are able to contact an inner periphery of the pipe.

In some embodiments of the sealing plug assembly, the proximal sealing element and the distal sealing element protrude around an exterior of the sealing plug assembly to provide points of contact between the sealing plug assembly and the inner surface of the pipe. Further, in some embodiments, the isolation plate can be configured such that there exists an isolation zone or axial isolation zone, wherein the axial isolation zone is a space or void that is bounded by a recess of the isolation plate, the proximal sealing element, or the distal sealing element, or any combination thereof.

In some embodiments, the nose piece includes a product port, which is configured to receive the bleed lance to enable draining or removal of the product from the nose piece. For example, the product port can be located on the nose piece such that the product port is on an exterior of the sealing plug assembly and has a shape or profile that matches or complements the shape or profile of a stab inlet of the bleed lance or matches or complements the shape or profile of a stab inlet adapter. For example, as shown in the exemplary illustration of FIG. 4A, the shape or profile of the product port can be a combination of a conical surface and one or more cylindrical surfaces that are complementary to the shape of the exterior of the stab inlet of the bleed lance. Further, for example, the product port can be configured to be opened or closed by insertion and rotation of the stab inlet of the bleed lance. Further, for example, the product port can be configured to be opened and merely accessed by insertion and alignment of the stab inlet of the bleed lance with the nose flow path. In some embodiments, the product port can be threaded to allow for the bleed lance to be inserted, aligned, and firmly held in place during an operation, maintaining alignment of the stab inlet of the bleed lance with the nose flow path.

In some embodiments, the nose piece can further include a cavity or recess provided on a proximal side face of the nose piece, and a nose flow path fluidically coupling the product port to the cavity zone. In some embodiments, the nose flow path, when the nose piece is assembled with the isolation plate, can fluidically couple with a similar passage, such as an axial passage (refer to FIGS. 6A and 6B) of the isolation plate, to fluidically couple the product port of the nose piece to the isolation zone between the proximal sealing element and the distal sealing element.

In some embodiments, the isolation plate is discoidal, has a circular isolation plate outer edge or outer radial edge, has a raised cylindrical surface on one side of the isolation plate, and a recessed surface on the opposite side of the isolation plate (opposite from the raised surface). In some embodiments, the isolation plate is discoidal, has a circular isolation plate outer edge or outer radial edge, has a raised non-cylindrical surface, such as octagonal raised surface or a hexagonal raised surface, on one side of the isolation plate, and a recessed surface on the opposite side of the isolation plate. In some embodiments, the recessed surface of the isolation plate can form a recess volume ranging from about 5.0 ml to about 30.0 ml.

In some embodiments of the isolation plate, the isolation plate can have a number of multiple bolt holes distributed around a center of the isolation plate at a bolt distance from the center of the isolation plate. In some embodiments of the isolation plate, the outer edge of the isolation plate can have a diameter of 1.7 cm to 107.1 cm. In some embodiments of the isolation plate, the circular flat top of the raised cylindrical surface can have a diameter of about 0.5 cm to about 85.0 cm and a raised cylindrical height of about 1.0 cm to about 3.0 cm. In some embodiments, the isolation plate can have a cylindrical recessed surface having a diameter of about 0.5 cm to about 5.0 cm and a cylindrical recessed depth of about 1.0 cm to about 3.0 cm. In some embodiments, the isolation plate can further include an axial passage, located along a center axis, and extending from the raised cylindrical surface to the recessed cylindrical surface. In some embodiments of the sealing plug assembly, the axial passage is fluidically coupled to the product port of the adjacently located nose piece. In some embodiments of the sealing plug assembly, a fluidic passage or fluid path is created from an isolation zone or axial isolation zone to the product port of the nose piece through the axial passage and the nose flow path of the nose piece. A benefit of the axial passage can be that it allows possible leakage past the proximal sealing element to be drained, or to keep exposure of the distal sealing element to a reduced pressure compared to pressure in the pipe, or both. In some embodiments of the isolation plate, the raised cylindrical surface for the raised non-cylindrical surface terminates in a surface that is flat, curved, or non-planar.

In some embodiments of the sealing plug assembly, the sealing plug assembly includes a plugging head having a plurality of outer bolt holes, a proximal sealing element having a plurality of outer bolt holes, a proximal nose ring having a plurality of outer bolt holes, an isolation plate having a plurality of outer bolt holes, a distal sealing element having a plurality of outer bolt holes, a distal nose ring having a plurality of outer bolt holes, and nose piece having a plurality of outer bolt holes. In some embodiments, the plurality of bolt holes of the plugging head, proximal sealing element, proximal nose ring, isolation plate, distal sealing element, distal nose ring, and nose piece align such that a plurality of bolts can fasten through the plugging head, proximal sealing element, proximal nose ring, isolation plate, distal sealing element, distal nose ring, and nose piece, fastening them together to form the sealing plug assembly.

In some embodiments of the sealing plug assembly, the sealing plug assembly includes a plugging head having a plurality of inner bolt holes and an isolation plate having a plurality of inner bolt holes. In some embodiments, the plurality of inner bolt holes in the plugging head and isolation plate align such that a plurality of inner bolts can be fastened through the plugging head and the isolation plate to fasten the isolation plate directly to the plugging head, or directly to a raised cylindrical surface of the plugging head, or directly to a raised non-cylindrical surface, such as a raised hexagonal surface or a raised octagonal surface.

In some embodiments, the plugging head has a sealing plug face having a flat outer portion having a plurality of outer bolt holes and a raised cylindrical surface, wherein the raised cylindrical surface terminates in a flat top having a plurality of inner bolt holes. In general, the number of inner and outer bolt holes and their spatial arrangement is not limited, so long as the bolt holes are aligned between adjacent layers or pieces and there are enough bolts to hold the sealing plug assembly together. As used herein, inner bolt holes and outer bolt holes are contrasted based on their distance from the center or central axis running through the center of the sealing plug assembly, going from a proximal direction to a distal direction.

In some embodiments the sealing plug assembly, the plugging head, the isolation plate, the proximal isolation ring, the proximal nose ring, the distal isolation ring, and the distal nose ring, and the nose piece are made of metal or a metal alloy, and optionally exclude any other material.

The present disclosure provides a sealing element for a sealing plug assembly. Although the sealing element is being disclosed in the context of the sealing plug assembly herein, it is believed that the sealing element itself can be used with any sealing plug. Therefore, the sealing element should not be construed as limited to the sealing plug assembly disclosed herein.

In some embodiments, the sealing element comprises a flat face and an elastomeric face. In some embodiments, the sealing element includes an outer edge having an exterior radius or exterior diameter, and an inner edge having an interior radius or inner diameter. In some embodiments, the elastomeric face has a circular groove extending a circular groove depth into the elastomeric face. In some embodiments, the inner edge, outer edge, or circular groove, or any combination thereof, of the sealing element are concentric along a central axis extending perpendicular to the sealing element. In some embodiments, to facilitate effective sealing, the circular groove can be coaxially located with the outer edge of the sealing element. In some embodiments, the circular groove is coaxial with the exteriors of the sealing plug assembly, the plugging head, or both.

In some embodiments, the elastomeric face of the sealing element can include a coaxially located circular groove extending a circular groove depth into the elastomeric face. A benefit of the circular groove can be allowing the outer edge of the sealing element to more easily conform to the interior surface of the pipe when the outer edge comes in contact with an inner surface of the pipe, simultaneously forcing the outer edge against the inner peripheral surface of the pipe to achieve more effective sealing than sealing elements without such a circular groove. Without wishing to be bound by theory, it is believed that the absence of material in the circular groove allows for the elastomeric material of the sealing element to more easily change its shape to adapt to the space between the exterior of a sealing plug and the interior of a pipe, relative to a sealing element without such a circular groove.

In some embodiments, the diameter of the sealing element can be in a range of from about 5.0 cm to about 150.0 cm, including from about 7.6 cm to about 142.3 cm. In some embodiments, an outer edge of the circular groove of the sealing element is located a radial distance of from about 1.2 cm to about 15.3 cm from the outer edge of the sealing element. In some embodiments, depth of the circular groove of the sealing element can range from about 0.5 cm to about 4.5 cm, including from about 0.6 cm to about 3.9 cm.

As can be understood by those skilled in the art, the exterior diameter of the sealing element can depend on or complement the size of the pipe. For example, the exterior diameter of the sealing element can be slightly higher than inner diameter of the pipe to achieve an effective seal. Generally, the diameter or radius of the sealing element is not limited, so long as the sealing element has an outer edge that is capable of protruding from the sealing plug that the sealing element is inserted into and so long as the circular groove extends beyond the edge of the sealing plug that the sealing element is inserted into.

As can be understood by those skilled in the art, the outer edge axial thickness of embodiments of the sealing element can depend on pressure of the product in the pipe. For example, when pressure of the product in the pipe is low, a lower outer edge axial thickness may be sufficient to achieve an effective seal. However, when pressure of the product in the pipe is high, a higher outer edge axial thickness may be required to achieve an effective seal. In some exemplary embodiments, the outer edge of the sealing element can have an outer edge axial thickness in a range of from about 1.0 cm to about 15.0 cm, including from about 1.8 cm to about 10.2 cm. In some embodiments, the inner edge of the sealing element can have an inner edge axial thickness in a range of about 1.0 cm to 15.0 cm, including from about 1.2 cm to about 10.2 cm.

In some embodiments, the proximal sealing element and the distal sealing element can be the same or different. In some embodiments, the proximal sealing element and the distal sealing element can have the same or similar dimensions but made of different materials. In some embodiments, the proximal sealing element and the distal sealing element can have same or similar materials with identical dimensions. In some embodiments, the distal sealing element can include a flat face, an elastomeric face, an outer edge having an exterior radius, and an inner edge having an interior radius. In some embodiments, the sealing element can be made of an elastomer and at least a portion of the flat face can include a fabric, such as cotton, polyester, or nylon. In some embodiments, the elastomeric face (seal side) faces upstream or the proximal direction within the sealing plug assembly while the fabric aside faces the downstream or distal direction within the sealing plug assembly.

It has been discovered that the incorporation of a rubber layer on the back of the fabric layer of the distal sealing element and the proximal sealing element can provide a better seal when pressed against a raised surface. In some embodiments of the sealing plug assembly, the isolation plate can have a raised outer isolation plate ring on the proximal side of the isolation plate, such that the raised outer isolation plate ring can press against the rubber layer of the proximal sealing element to provide a superior seal, relative to the same raised outer isolation plate ring pressed against the fabric layer of the proximal sealing element. In some embodiments of the sealing plug assembly, the nose piece can have a raised nose piece ring on the proximal side of the nose piece, such that the raised nose piece ring can press against the rubber layer of the distal sealing element to provide a superior seal, relative to the same raised nose piece ring pressed against the fabric layer of a distal sealing element.

In some embodiments, the distal sealing element and the proximal sealing element can include an elastomeric face that includes an elastomeric material, a flat face that includes a fabric layer and a rubber layer, wherein the fabric layer is in direct contact with the elastomeric layer and the rubber layer. In some embodiments, the distal sealing element and the proximal sealing element can include a fabric layer adhered to an elastomeric layer on one side and a rubber layer adhered to a side opposite of the fabric layer. In some embodiments, material of the elastomeric layer can be the same or different from the material of the rubber layer. In some embodiments, the distal sealing element and the proximal sealing element can include a flat fabric layer bound to a flat rubber layer, wherein the flat fabric layer is bound to a shaped elastomeric layer.

The present disclosure provides a bleed lance for draining an isolation zone of a sealing plug assembly. Although the bleed lance is being disclosed in the context of the sealing plug assembly herein, it is believed that the bleed lance itself can be used to drain or harvest product from a variety of containers with or without a sealing plug. Therefore, the bleed lance should not be construed as limited to the sealing plug assembly disclosed herein.

In some embodiments, the bleed lance comprises a stab inlet, a body, and a bleed lance exit. In some embodiments, the bleed lance body includes a hollow pipe or tube. In some embodiments, the body is connected to the stab inlet and the bleed lance exit by a lance flow pathway. In some embodiments, the bleed lance is configured to, when coupled to the product port, open or access a nose flow pathway that is connected to the product port. In some embodiments, the stab inlet has a stab inlet exterior that contains a stab inlet opening. In some embodiments, the stab inlet exterior is configured to fit or has a shape complimentary to a product port on a nose piece of a sealing plug assembly. In some embodiments, the stab inlet exterior is threaded to fit complimentary a product port on a nose piece of a sealing plug assembly.

In some embodiments, the body includes a rigid material and has a body length of from about 10 cm to about 1,000 cm and a body internal diameter of from about 0.5 cm to about 5.0 cm. Generally, the lengths of the body and body internal diameter are not generally limited so long as the bleed lance can be manipulated and can transport liquid from the stab inlet to the bleed lance exit. In some embodiments, the bleed lance exit may have an external lip that is capable of being attached to a hose or tube.

In some embodiments, the stab inlet has a stab inlet exterior that contains a stab inlet opening and wherein the stab inlet includes a stab inlet adapter. In some embodiments, a bottom end of the stab inlet adapter is configured to fit or has a shape complementary to a product port on a nose piece of a sealing plug assembly. In some embodiments, a top end of the stab inlet adapter is configured to fit or has a shape complementary to the stab inlet exterior.

In some embodiments, the stab inlet has an exterior surface that contains a pin protruding from the stab inlet exterior. In some embodiments, the bleed lance can be inserted on the downstream side of the pipe by cutting an opening into the pipe such that the bleed lance can engage with a product port in the nose piece of the sealing plug assembly.

The present disclosure further provides a system for stopping a pipe containing a liquid or a gas product. In some embodiments, the system comprises a sealing plug assembly according to any combination of the embodiments disclosed above, and a bleed lance according to any combination of the embodiments discussed above. In some embodiments, the system comprises a plugging head, a proximal sealing element, a distal sealing element, an isolation plate, and a nose piece. In some embodiments of the system, the proximal sealing element is located closer to the plugging head than the distal sealing element. In some embodiments of the system, the proximal sealing element protrudes around an exterior of the sealing plug assembly. In some embodiments of the system, the distal sealing element is located closer to the nose piece than the proximal sealing element. In some embodiments of the system, the distal sealing element protrudes around the exterior of the sealing plug assembly. In some embodiments of the system, the isolation plate is contained in an interior of the sealing plug assembly and located between the proximal sealing element and the distal sealing element. In some embodiments of the system, the nose piece has a product port located on the exterior of the sealing plug assembly and the product port is connected to the isolation plate by a nose flow pathway. In some embodiments of the system, the system further comprises a bleed lance that includes a stab inlet, a body, and a bleed lance exit. In some embodiments of the system, the body includes a hollow pipe or tube, and is connected to the stab inlet and the bleed lance exit by a lance flow pathway. In some embodiments of the system, the product port of the nose piece has a product port surface that is complimentary to the stab inlet of a bleed lance. In some embodiments of the system, the product port is configured to be opened or closed by insertion and rotation of the stab inlet of the bleed lance.

In some embodiments, the system for stopping a pipe containing a fluid product can include a sealing plug assembly having a plugging head, a proximal sealing element, a distal sealing element, an isolation plate, and a nose piece. In some embodiments, the system further can further include a bleed lance. In some embodiments, the sealing plug assembly can be inserted within a pipe after fixing a fitting comprising a split-T 110 around the pipe, cutting and removing a portion of the pipe using a hole saw. In some embodiments, a sealing plug housing can be used to position the sealing plug assembly such that the proximal sealing element and the distal sealing element engage with inner periphery of the pipe to block flow of the fluid product from one side of the pipe, i.e., an upstream side or direction, to the other side, i.e., downstream side or direction of the pipe.

The present disclosure also provides a system for stopping a pipe containing a fluid product. The system comprises a sealing plug assembly having a proximal sealing element and a distal sealing element with an isolation zone therebetween fluidically coupled to a nose piece of the sealing plug assembly; and a bleed lance configured to be coupled to the nose piece of the sealing plug assembly for the product to be drained from the isolation zone between the proximal sealing element and the distal sealing element.

The present disclosure also provides a method of stopping a pipe containing a product. In some embodiments, the method comprises: providing a sealing plug assembly connected to a sealing plug housing, wherein the sealing plug assembly includes a plugging head, a proximal sealing element, a distal sealing element, an isolation plate, and a nose piece; and sealing the pipe containing the product by sealing the outer edge of the proximal sealing element and the outer edge of the distal sealing element against an interior surface of the pipe. In some embodiments, the method comprises: providing a sealing plug assembly according to any embodiment disclosed herein, and then sealing the pipe containing the product by sealing the outer edge of the proximal sealing element and the outer edge of the distal sealing element against an interior surface of the pipe.

In some embodiments, the method 800 includes: 802 providing sealing plug assembly connected to a sealing plug housing, wherein the sealing plug assembly contains a sealing plug head, a proximal sealing element, a distal sealing element, an isolation plate, and a nose piece; 804 sealing a pipe containing the product by sealing an outer edge of the proximal sealing element and an outer edge of the distal sealing element against an interior surface of the pipe; 806 accessing a product port in the nose piece by cutting an opening into the pipe downstream of the sealing plug assembly and approximate to the product port, thus providing access to the product port of the nose piece of the sealing plug assembly; 808 inserting a bleed lance in the product port of the sealing plug assembly; 810 flowing liquid or gas product from the sealing plug assembly through the bleed lance to the bleed lance exit; and, optionally, 812 attaching a tube or hose to the bleed lance exit, collecting at least a portion of the product.

In some embodiments of the method of stopping a pipe containing a product and the system for stopping a pipe containing a fluid product, the sealing plug assembly does not extend outside of the fitting. In some embodiments of the system for stopping a pipe containing a fluid product, the system includes a fitting around a pipe. A benefit of surrounding the pipe with a fitting before and during insertion of the sealing plug assembly can be providing a firm surface outside the pipe to prevent or reduce damage to the pipe when portions of the sealing plug assembly press against the interior of the pipe.

MORE EMBODIMENTS

Embodiment 1. A sealing plug assembly comprising:
a plugging head, a proximal sealing element, a distal sealing element, an isolation plate, and a nose piece,
wherein the proximal sealing element is located closer to the plugging head than the distal sealing element, and wherein proximal sealing element protrudes around an exterior of the sealing plug assembly,
wherein the distal sealing element is located closer to the nose piece than the proximal sealing element, and wherein the distal sealing element protrudes around the exterior of the sealing plug assembly, and
wherein the isolation plate is contained in an interior of the sealing plug assembly and located between the proximal sealing element and the distal sealing element.

Embodiment 2. The sealing plug assembly of one or more of embodiments 1-7, wherein the nose piece has a product port located on the exterior of the sealing plug assembly and the product port is connected to the isolation plate by a nose flow pathway, and wherein the nose flow pathway can be accessed by connecting a bleed lance to the product port; or
wherein the nose piece has a product port located on the exterior of the sealing plug assembly and the product port is connected to the isolation plate by a nose flow pathway, and wherein the product port of the nose piece is configured to or has a product port surface that is complimentary to a key inlet of a bleed lance, and the product port is configured to be opened or closed by insertion and rotation of the key inlet of the bleed lance.

Embodiment 3. The sealing plug assembly of one or more of embodiments 1-7, further comprising:
  a proximal nose ring, an isolation plate, and a distal nose ring, wherein the proximal nose ring and the isolation plate are located between the proximal sealing element and the distal sealing element, and wherein the distal nose ring is located between the distal sealing element and the nose piece.

Embodiment 4. The sealing plug assembly of one or more of embodiments 1-7,
  wherein the proximal sealing element includes a flat face, an elastomeric face, an outer edge having an exterior diameter, and an inner edge having an interior diameter, and
  wherein the elastomeric face has a circular groove extending a circular groove depth into the elastomeric face, and
  wherein at least one of the inner edge, outer edge, and circular groove of the proximal sealing element is coaxial with the exterior of the sealing plug assembly, the plugging head, or both; and
  wherein the outer edge has an outer edge thickness of from about 1.8 cm to about 10.2 cm, or
  wherein the inner edge has an inner edge thickness of from about 1.8 cm to about 10.2 cm, or
  wherein the exterior diameter is from about 7.6 cm to about 142.3 cm, or
  wherein an outer edge of the circular groove is located a radial distance of from about 1.2 cm to about 15.3 cm from the outer edge of the proximal sealing element, or
  wherein the circular groove depth is from about 0.6 cm to about 3.9 cm.

Embodiment 5. The sealing plug assembly of one or more of embodiments 1-7,
  wherein the distal sealing element includes a flat face, an elastomeric face, an outer edge having an exterior diameter, and an inner edge having an interior diameter, and
  wherein the elastomeric face has a circular groove extending a circular groove depth into the elastomeric face, and
  wherein at least one of the inner edge, outer edge, and circular groove of the distal sealing element is coaxial with the exterior of the sealing plug assembly, the plugging head, or both; and
  wherein the outer edge has an outer edge thickness of from about 1.8 cm to about 10.2 cm, or
  wherein the inner edge has an inner edge thickness of from about 1.8 cm to about 10.2 cm, or
  wherein the exterior diameter is from about 7.6 cm to about 142.3 cm, or
  wherein an outer edge of the circular groove is located a radial distance of from about 1.2 cm to about 15.3 cm from the outer edge of the distal sealing element, or
  wherein the circular groove depth is from about 0.6 cm to about 3.9 cm.

Embodiment 6. The sealing plug assembly of one or more of embodiments 1-7, further comprising:
  a proximal nose ring, a distal nose ring, and an isolation plate,
  wherein a portion of the plugging head directly contacts or is adjacent to the proximal sealing element, a portion of the proximal sealing element directly contacts or is adjacent to the proximal nose ring, a portion of the proximal nose ring directly contacts or is adjacent to the isolation plate, a portion of the isolation plate directly contacts or is adjacent to the distal sealing element, a portion of the distal sealing element directly contacts or is adjacent to the distal nose ring, and the distal nose ring directly contacts or is adjacent to the nose piece.

Embodiment 7. The sealing plug assembly of one or more of embodiments 1-7,
  wherein the isolation plate is formed from or bounded by at least a proximal face of the isolation plate, an inner diameter of the proximal sealing element, and an inner diameter of the proximal nose ring Embodiment 8. A sealing element for a sealing plug assembly comprising:
  a flat face, an elastomeric face, an outer edge having an exterior diameter, and an inner edge having an interior diameter, and
  wherein the elastomeric face has a circular groove extending a circular groove depth into the elastomeric face,
  wherein at least one of the inner edge, outer edge, and circular groove of the sealing element are concentric, and
  wherein an outer edge of the circular groove is located a radial distance of from about 1.2 cm to about 15.3 cm from the outer edge of the sealing element, or
  wherein the groove depth is from about 0.6 cm to about 3.9 cm.

Embodiment 9. The sealing element of embodiment 8, wherein at least a portion of the flat face includes a fabric, and
  wherein the outer edge having an outer edge thickness of from about 1.8 cm to about 10.2 cm, or
  wherein the inner edge having an inner edge thickness of from about 1.8 cm to about 10.2 cm, or
  wherein the exterior diameter is from about 7.6 cm to about 142.3 cm.

Embodiment 10. A bleed lance for draining an isolation zone of a sealing plug assembly comprising:
  a key inlet, a body, and a bleed lance exit,
  wherein the body includes a hollow pipe or tube, and the body is connected to the key inlet and the bleed lance exit by a lance flow pathway.

Embodiment 11. The bleed lance of embodiment 10, wherein the key inlet has a key inlet exterior that contains a key inlet opening and the key inlet exterior is configured to fit or has a shape complimentary to a product port on a nose piece of a sealing plug assembly; or
  wherein the body includes a rigid material and has a body length of from about 10 cm to about 500 cm and a body internal diameter of from about 0.5 cm to about 5.0 cm; or
  wherein the key inlet has a key inlet exterior that contains a key inlet opening and wherein the key inlet includes a key inlet adapter,
  wherein a bottom end of the key inlet adapter is configured to fit or has a shape complementary to a product port on a nose piece of a sealing plug assembly;
  wherein a top end of the key inlet adapter is configured to fit or has a shape complementary to the key inlet exterior; or
  wherein the key inlet has an exterior surface that contains a pin protruding from the key inlet exterior.

Embodiment 12. A method of stopping a pipe containing a product, comprising:
  providing a sealing plug assembly connected to a sealing plug actuator, wherein the sealing plug assembly includes a plugging head, a proximal sealing element, a distal sealing element, an isolation plate, and a nose piece, wherein the proximal sealing element is located closer to the plugging head than the distal sealing element, and wherein proximal sealing element protrudes around an exterior of the sealing plug assembly, wherein the distal sealing element is located closer to the nose piece than the proximal sealing element, and wherein the distal sealing element protrudes around the exterior of the sealing plug assembly, and wherein the isolation plate is contained in an interior of the sealing plug assembly and located between the proximal sealing element and the distal sealing element; and sealing the pipe containing the product by sealing the outer edge of the proximal sealing element and the outer edge of the distal sealing element against an interior surface of the pipe.

Embodiment 13. The method of one or more of embodiments 12-16, wherein the nose piece has a product port located on the exterior of the sealing plug assembly and the product port is connected to the isolation plate by a nose flow pathway.

Embodiment 14. The method of one or more of embodiments 12-16, further comprising:

accessing the product port by cutting an opening into the pipe containing the product, and opening the nose flow pathway of the product port by inserting a bleed lance into the product port and rotating the bleed lance.

Embodiment 15. The method of one or more of embodiments 12-16, further comprising:

wherein the bleed lance includes a key inlet, a body, and a bleed lance exit, wherein the body includes a hollow pipe or tube, and the body is connected to the key inlet and the bleed lance exit by a lance flow pathway, and wherein the product can be a liquid, a slurry, a gas, or any combination thereof, flowing the product from the liquid product though the bleed lance exit.

Embodiment 16. The method of one or more of embodiments 12-16, attaching a tube or hose to the bleed lance exit and collecting at least a portion of the product.

Embodiment 17. A system for stopping a pipe containing a liquid product, the system comprising:

a plugging head, a proximal sealing element, a distal sealing element, an isolation plate, and a nose piece, wherein the proximal sealing element is located closer to the plugging head than the distal sealing element, and wherein proximal sealing element protrudes around an exterior of the sealing plug assembly, wherein the distal sealing element is located closer to the nose piece than the proximal sealing element, and wherein the distal sealing element protrudes around the exterior of the sealing plug assembly, and wherein the isolation plate is contained in an interior of the sealing plug assembly and located between the proximal sealing element and the distal sealing element, wherein the nose piece has a product port located on the exterior of the sealing plug assembly and the product port is connected to the isolation plate by a nose flow pathway; and a bleed lance, wherein the bleed lance includes a key inlet, a body, and a bleed lance exit, wherein the body includes a hollow pipe or tube, and the body is connected to the key inlet and the bleed lance exit by a lance flow pathway, and wherein the product port of the nose piece is configured to or has a product port surface that is complimentary to the key inlet of a bleed lance, and the product port is configured to be opened or closed by insertion and rotation of the key inlet of the bleed lance.

Embodiment 101. A sealing plug assembly comprising:

a plugging head, a proximal sealing element, a distal sealing element, an isolation plate, and a nose piece, wherein the proximal sealing element is located closer to the plugging head than the distal sealing element, and wherein proximal sealing element protrudes around an exterior of the sealing plug assembly, wherein the distal sealing element is located closer to the nose piece than the proximal sealing element, and wherein the distal sealing element protrudes around the exterior of the sealing plug assembly, and wherein the isolation plate is contained in an interior of the sealing plug assembly and located between the proximal sealing element and the distal sealing element.

Embodiment 102. The sealing plug assembly of one or more of embodiments 101-108, wherein the nose piece has a product port located on the exterior of the sealing plug assembly and the product port is connected to the isolation plate by a nose flow pathway, and wherein the nose flow pathway can be accessed by connecting a bleed lance to the product port; or wherein the nose piece has a product port located on the exterior of the sealing plug assembly and the product port is connected to the isolation plate by a nose flow pathway, and wherein the product port of the nose piece is configured to or has a product port surface that is complimentary to a stab inlet of a bleed lance, and the product port is configured to be opened or closed by insertion and rotation of the stab inlet of the bleed lance.

Embodiment 103. The sealing plug assembly of one or more of embodiments 101-108, further comprising:

a proximal nose ring and a distal nose ring, wherein the proximal nose ring and the isolation plate are located between the proximal sealing element and the distal sealing element, and wherein the distal nose ring is located between the distal sealing element and the nose piece.

Embodiment 104. The sealing plug assembly of one or more of embodiments 101-108, wherein the proximal sealing element includes a flat face, an elastomeric face, an outer edge having an exterior diameter, and an inner edge having an interior diameter, and wherein the elastomeric face has a circular groove extending a circular groove depth into the elastomeric face, and wherein at least one of the inner edge, the outer edge, and the circular groove of the proximal sealing element is coaxial with the exterior of the sealing plug assembly, the plugging head, or both; and wherein the outer edge has an outer edge axial thickness of from about 1.8 cm to about 10.2 cm, or wherein the inner edge has an inner edge axial thickness of from about 1.2 cm to about 10.2 cm, or wherein the exterior diameter is from about 7.6 cm to about 142.3 cm, or wherein an outer edge of the circular groove is located a radial distance of from about 1.2 cm to about 15.3 cm from the outer edge of the proximal sealing element, or wherein the circular groove depth is from about 0.6 cm to about 3.9 cm.

Embodiment 105. The sealing plug assembly of one or more of embodiments 101-108, wherein the distal sealing element includes a flat face, an elastomeric face, an outer edge having an exterior diameter, and an inner edge having an interior diameter, and wherein the elastomeric face has a circular groove extending a circular groove depth into the elastomeric face, and wherein at least one of the inner edge, the outer edge, and the circular groove of the distal sealing element is coaxial with the exterior of the sealing plug assembly, the plugging head, or both; and wherein the outer edge has an outer edge axial thickness of from about 1.8 cm to about 10.2 cm, or wherein the inner edge has an inner edge axial thickness of from about 1.2 cm to about 10.2 cm, wherein the exterior diameter is from about 7.6 cm to about 142.3 cm, or wherein an outer edge of the circular groove is located a radial distance of from about 1.2 cm to about 15.3 cm from the outer edge of the distal sealing element, or wherein the circular groove depth is from about 0.6 cm to about 3.9 cm.

Embodiment 106. The sealing plug assembly of one or more of embodiments 101-108, further comprising:

a proximal nose ring and a distal nose ring, wherein a portion of the plugging head directly contacts or is adjacent to the proximal sealing element, a portion of the proximal sealing element directly contacts or is adjacent to the proximal nose ring, a portion of the proximal nose ring directly contacts or is adjacent to the isolation plate, a portion of the isolation plate directly contacts or is adjacent to the distal sealing element, a portion of the distal sealing element directly contacts or is adjacent to the distal nose ring, and the distal nose ring directly contacts or is adjacent to the nose piece; or further comprising:

a proximal isolation ring, a proximal nose ring, a distal isolation ring, and a distal nose ring, wherein a portion of the plugging head directly contacts or is adjacent to the proximal isolation ring or the isolation plate, wherein a portion of the proximal isolation ring directly contacts or is adjacent to the proximal sealing element, wherein a portion of the proximal sealing element directly contacts or is adjacent to the proximal nose ring, wherein the proximal nose ring directly contacts or is adjacent to a portion of the isolation plate, wherein a portion of the isolation plate directly contacts or is adjacent to the distal isolation ring or the nose piece, wherein a portion of the distal isolation ring directly contacts or is adjacent to the distal sealing element, wherein a portion of the distal sealing element directly contacts or is adjacent to the distal nose ring, and wherein a portion of the distal nose ring directly contacts or is adjacent to the nose piece.

Embodiment 107. The sealing plug assembly of one or more of embodiments 101-108, wherein the isolation plate includes a cylindrical raised portion on a distal face of the isolation plate, a cylindrical depressed portion on a proximal face of the isolation plate, an axial passage that passes through a center of the isolation plate, and one or more radial fluid pathways, wherein the radial fluid pathways connect an isolation plate radial port to an isolation zone port, wherein isolation plate radial port is located on an outer edge of the isolation plate and the isolation zone port is located on an inner edge of the cylindrical depressed portion of the isolation plate; and wherein the isolation radial port is fluidly connected by the radial fluid pathway to the isolation zone port, wherein the isolation zone port is fluidly connected by the axial passage to a nose flow pathway of the nose piece, and the nose flow pathway of the nose piece is fluidly connected to a product port located on an exterior of the nose piece.

Embodiment 108 The sealing plug assembly of one or more of embodiments 101-108, wherein the distal sealing element includes an elastomeric face and a flat face, wherein the elastomeric face contains an elastomeric layer, the flat face contains fabric layer and rubber layer, wherein the fabric layer is bound to and between the elastomeric layer and the rubber layer, and wherein nose piece has a raised nose piece ring that is coaxial with the center axis of the sealing plug assembly and closer to the outer radial edge than a plurality of bolt holes, and the raised nose piece ring protrudes out from a surface of a proximal face of the nose piece and is in direct contact with the rubber layer of the distal sealing element; or wherein the proximal sealing element includes an elastomeric face and a flat face, wherein the elastomeric face contains an elastomeric layer, the flat face contains fabric layer and rubber layer, wherein the fabric layer is bound to and between the elastomeric layer and the rubber layer, and wherein the isolation plate has a raised outer isolation plate ring that is coaxial with the center axis of the sealing plug assembly and closer to the outer radial edge than a plurality of bolt holes, and the raised outer isolation plate ring is in direct contact with a rubber layer of the proximal sealing element.

Embodiment 109. A sealing element for a sealing plug assembly comprising:

a flat face, an elastomeric face, an outer edge having an exterior diameter, and an inner edge having an interior diameter, and wherein the elastomeric face has a circular groove extending a circular groove depth into the elastomeric face, wherein at least one of the inner edge, the outer edge, and the circular groove of the sealing element are concentric, and wherein an outer edge of the circular groove is located a radial distance of from about 1.2 cm to about 15.3 cm from the outer edge of the sealing element, or wherein the groove depth is from about 0.6 cm to about 3.9 cm.

Embodiment 110. The sealing element of one or more of embodiments 109-111, wherein at least a portion of the flat face includes a fabric or a rubber, and wherein the outer edge having an outer edge axial thickness of from about 1.8 cm to about 10.2 cm, or wherein the inner edge having an inner edge axial thickness of from about 1.2 cm to about 10.2 cm, or wherein the exterior diameter is from about 7.6 cm to about 142.3 cm.

Embodiment 111 The sealing element of one or more of embodiments 109-111, wherein the sealing element includes an elastomeric face and a flat face, wherein the elastomeric face contains an elastomeric layer, the flat face contains fabric layer and rubber layer, wherein the fabric layer is bound to and between the elastomeric layer and the rubber layer.

Embodiment 112. A bleed lance for draining an isolation zone of a sealing plug assembly comprising:
a stab inlet, a body, and a bleed lance exit,
wherein the body includes a hollow pipe or tube, and the body is connected to the stab inlet and the bleed lance exit by a lance flow pathway.

Embodiment 113. The bleed lance of embodiment 112, wherein the stab inlet has a stab inlet exterior that contains a stab inlet opening and the stab inlet exterior is configured to fit or has a shape complimentary to a product port on a nose piece of a sealing plug assembly; or
wherein the body includes a rigid material and has a body length of from about 10 cm to about 500 cm and a body internal diameter of from about 0.5 cm to about 5.0 cm; or
wherein the stab inlet has a stab inlet exterior that contains a stab inlet opening and wherein the stab inlet includes a stab inlet adapter,
wherein a bottom end the stab inlet adapter is configured to fit or has a shape complementary to a product port on a nose piece of a sealing plug assembly;
wherein a top end of the stab inlet adapter is configured to fit or has a shape complementary to the stab inlet exterior; or
wherein the stab inlet has an exterior surface that contains a pin protruding from the stab inlet exterior.

Embodiment 114. A method of stopping a pipe containing a product, comprising:
providing a sealing plug assembly connected to a sealing plug housing, wherein the sealing plug assembly includes a plugging head, a proximal sealing element, a distal sealing element, an isolation plate, and a nose piece,
wherein the proximal sealing element is located closer to the plugging head than the distal sealing element, and wherein proximal sealing element protrudes around an exterior of the sealing plug assembly,
wherein the distal sealing element is located closer to the nose piece than the proximal sealing element, and wherein the distal sealing element protrudes around the exterior of the sealing plug assembly, and
wherein the isolation plate is contained in an interior of the sealing plug assembly and located between the proximal sealing element and the distal sealing element; and
sealing the pipe containing the product by sealing the outer edge of the proximal sealing element and the outer edge of the distal sealing element against an interior surface of the pipe.

Embodiment 115. The method of one or more of embodiments 114-119,
wherein the nose piece has a product port located on the exterior of the sealing plug assembly and the product port is connected or fluidly connected to the isolation plate by a nose flow pathway.

Embodiment 116. The method of one or more of embodiments 114-119, further comprising:
accessing the product port by cutting an opening into the pipe containing the product, and
opening the nose flow pathway of the product port by inserting a bleed lance into the product port and rotating the bleed lance.

Embodiment 117. The method of one or more of embodiments 114-119, further comprising:
wherein the bleed lance includes a stab inlet, a body, and a bleed lance exit,
wherein the body includes a hollow pipe or tube, and the body is connected to the stab inlet and the bleed lance exit by a lance flow pathway, and
wherein the product can be a liquid, a slurry, a gas, or any combination thereof,
flowing the product from the fluid product though the bleed lance exit.

Embodiment 118. The method of one or more of embodiments 114-119,
attaching a tube or hose to the bleed lance exit and collecting at least a portion of the product.

Embodiment 119. The method of one or more of embodiments 114-119, wherein the isolation plate includes a cylindrical raised portion on a distal face of the isolation plate, a cylindrical depressed portion on a proximal face of the isolation plate, an axial passage that passes through a center of the isolation plate, and one or more radial fluid pathways, wherein the radial fluid pathways connect an isolation plate radial port to an isolation zone port, wherein isolation plate radial port is located on an outer edge of the isolation plate and the isolation zone port is located on an inner edge of the cylindrical depressed portion of the isolation plate; and
wherein the isolation radial port is fluidly connected by the radial fluid pathway to the isolation zone port, wherein the isolation zone port is fluidly connected by the axial passage to a nose flow pathway of the nose piece, and the nose flow pathway of the nose piece is fluidly connected to a product port located on an exterior of the nose piece.

Embodiment 120. A system for stopping a pipe containing a liquid, gas, or slurry product, the system comprising:
a plugging head, a proximal sealing element, a distal sealing element, an isolation plate, and a nose piece,
wherein the proximal sealing element is located closer to the plugging head than the distal sealing element, and wherein proximal sealing element protrudes around an exterior of the sealing plug assembly,
wherein the distal sealing element is located closer to the nose piece than the proximal sealing element, and wherein the distal sealing element protrudes around the exterior of the sealing plug assembly, and
wherein the isolation plate is contained in an interior of the sealing plug assembly and located between the proximal sealing element and the distal sealing element,
wherein the nose piece has a product port located on the exterior of the sealing plug assembly and the product port is connected to the isolation plate by a nose flow pathway; and
a bleed lance, wherein the bleed lance includes a stab inlet, a body, and a bleed lance exit, wherein the body includes a hollow pipe or tube, and the body is connected to the stab inlet and the bleed lance exit by a lance flow pathway, and
wherein the product port of the nose piece is configured to or has a product port surface that is complimentary to the stab inlet of a bleed lance, and the product port is configured to be opened or closed by insertion and rotation of the stab inlet of the bleed lance.

Embodiment 121. The system of one or more of embodiments 120-124, wherein the proximal sealing element includes a flat face, an elastomeric face, an outer edge having an exterior diameter, and an inner edge having an interior diameter, and
    wherein the elastomeric face has a circular groove extending a circular groove depth into the elastomeric face, and
    wherein at least one of the inner edge, the outer edge, and the circular groove of the proximal sealing element is coaxial with the exterior of the sealing plug assembly, the plugging head, or both; and
    wherein the outer edge has an outer edge axial thickness of from about 1.8 cm to about 10.2 cm, or
    wherein the inner edge has an inner edge axial thickness of from about 1.2 cm to about 10.2 cm, or
    wherein the exterior diameter is from about 7.6 cm to about 142.3 cm, or
    wherein an outer edge of the circular groove is located a radial distance of from about 1.2 cm to about 15.3 cm from the outer edge of the proximal sealing element, or
    wherein the circular groove depth is from about 0.6 cm to about 3.9 cm.

Embodiment 122. The system of one or more of embodiments 120-124, further comprising:
    a proximal nose ring and a distal nose ring,
    wherein a portion of the plugging head directly contacts or is adjacent to the proximal sealing element, a portion of the proximal sealing element directly contacts or is adjacent to the proximal nose ring, a portion of the proximal nose ring directly contacts or is adjacent to the isolation plate, a portion of the isolation plate directly contacts or is adjacent to the distal sealing element, a portion of the distal sealing element directly contacts or is adjacent to the distal nose ring, and the distal nose ring directly contacts or is adjacent to the nose piece; or
    further comprising:
    a proximal isolation ring, a proximal nose ring, a distal isolation ring, and a distal nose ring,
    wherein a portion of the plugging head directly contacts or is adjacent to the proximal isolation ring or the isolation plate, wherein a portion of the proximal isolation ring directly contacts or is adjacent to the proximal sealing element, wherein a portion of the proximal sealing element directly contacts or is adjacent to the proximal nose ring, wherein the proximal nose ring directly contacts or is adjacent to a portion of the isolation plate, wherein a portion of the isolation plate directly contacts or is adjacent to the distal isolation ring or the nose piece, wherein a portion of the distal isolation ring directly contacts or is adjacent to the distal sealing element, wherein a portion of the distal sealing element directly contacts or is adjacent to the distal nose ring, and wherein a portion of the distal nose ring directly contacts or is adjacent to the nose piece.

Embodiment 123. The system of one or more of embodiments 120-124, wherein the isolation plate includes a cylindrical raised portion on a distal face of the isolation plate, a cylindrical depressed portion on a proximal face of the isolation plate, an axial passage that passes through a center of the isolation plate, and one or more radial fluid pathways, wherein the radial fluid pathways connect an isolation plate radial port to an isolation zone port, wherein isolation plate radial port is located on an outer edge of the isolation plate and the isolation zone port is located on an inner edge of the cylindrical depressed portion of the isolation plate; and
    wherein the isolation radial port is fluidly connected by the radial fluid pathway to the isolation zone port, wherein the isolation zone port is fluidly connected by the axial passage to a nose flow pathway of the nose piece, and the nose flow pathway of the nose piece is fluidly connected to a product port located on an exterior of the nose piece.

Embodiment 124. The system of one or more of embodiments 120-124, wherein the stab inlet has a stab inlet exterior that contains a stab inlet opening and the stab inlet exterior is configured to fit or has a shape complimentary to a product port on a nose piece of a sealing plug assembly; or
    wherein the body includes a rigid material and has a body length of from about 10 cm to about 500 cm and a body internal diameter of from about 0.5 cm to about 5.0 cm; or
    wherein the stab inlet has a stab inlet exterior that contains a stab inlet opening and wherein the stab inlet includes a stab inlet adapter,
    wherein a bottom end the stab inlet adapter is configured to fit or has a shape complementary to a product port on a nose piece of a sealing plug assembly;
    wherein a top end of the stab inlet adapter is configured to fit or has a shape complementary to the stab inlet exterior; or
    wherein the stab inlet has an exterior surface that contains a pin protruding from the stab inlet exterior.

EXAMPLES

All of the pieces shown in FIG. 3 are manufactured in compatible sizes and assembled as shown. The sealing elements shown in FIGS. 5A and 5B. are manufactured by cutting a circular groove into a commercially available sealing element. The bleed lance is manufactured as shown in FIG. 7A and FIG. 7B. All of the pieces shown in FIGS. 11A and 11B are manufactured in compatible sizes and assembled as shown.

What is claimed is:

1. A sealing plug assembly comprising:
    a plugging head, a proximal sealing element, a distal sealing element, an isolation plate, and a nose piece,
    wherein the proximal sealing element is located closer to the plugging head than the distal sealing element, and wherein proximal sealing element protrudes around an exterior of the sealing plug assembly,
    wherein the distal sealing element is located closer to the nose piece than the proximal sealing element, and wherein the distal sealing element protrudes around the exterior of the sealing plug assembly,
    wherein the isolation plate is contained in an interior of the sealing plug assembly and located between the proximal sealing element and the distal sealing element, and
    wherein the nose piece has a product port located on the exterior of the sealing plug assembly and the product port is connected to the isolation plate by a nose flow pathway.

2. The sealing plug assembly of claim 1, wherein the nose flow pathway can be accessed by connecting a bleed lance to the product port; or
    wherein the product port of the nose piece is configured to or has a product port surface that is complimentary to a stab inlet of a bleed lance, and the product port is configured to be opened or closed by insertion and rotation of the stab inlet of the bleed lance.

3. The sealing plug assembly of claim 1, further comprising:
   a proximal nose ring and a distal nose ring, wherein the proximal nose ring and the isolation plate are located between the proximal sealing element and the distal sealing element, and wherein the distal nose ring is located between the distal sealing element and the nose piece.

4. A sealing plug assembly comprising:
   a plugging head, a proximal sealing element, a distal sealing element, an isolation plate, and a nose piece,
   wherein the proximal sealing element is located closer to the plugging head than the distal sealing element, and wherein proximal sealing element protrudes around an exterior of the sealing plug assembly,
   wherein the distal sealing element is located closer to the nose piece than the proximal sealing element, and wherein the distal sealing element protrudes around the exterior of the sealing plug assembly,
   wherein the isolation plate is contained in an interior of the sealing plug assembly and located between the proximal sealing element and the distal sealing element, and
   wherein the nose piece has a product port located on the exterior of the sealing plug assembly and the product port is connected to the isolation plate by a nose flow pathway,
   wherein the proximal sealing element or the distal sealing element, or both, includes a flat face, an elastomeric face, an outer edge having an exterior diameter, and an inner edge having an interior diameter, and
   wherein the elastomeric face has a circular groove extending a circular groove depth into the elastomeric face, and
   wherein at least one of the inner edge, the outer edge, and the circular groove of the proximal sealing element or the distal sealing element, or both, is coaxial with the exterior of the sealing plug assembly, the plugging head, or both; and
   wherein the outer edge has an outer edge axial thickness of from about 1.8 cm to about 10.2 cm, or
   wherein the inner edge has an inner edge axial thickness of from about 1.2 cm to about 10.2 cm, or
   wherein the exterior diameter is from about 7.6 cm to about 142.3 cm, or
   wherein an outer edge of the circular groove is located a radial distance of from about 1.2 cm to about 15.3 cm from the outer edge of the proximal sealing element or the distal sealing element, or both, or
   wherein the circular groove depth is from about 0.6 cm to about 3.9 cm.

5. The sealing plug assembly of claim 1, further comprising:
   a proximal nose ring and a distal nose ring,
   wherein a portion of the plugging head directly contacts or is adjacent to the proximal sealing element, a portion of the proximal sealing element directly contacts or is adjacent to the proximal nose ring, a portion of the proximal nose ring directly contacts or is adjacent to the isolation plate, a portion of the isolation plate directly contacts or is adjacent to the distal sealing element, a portion of the distal sealing element directly contacts or is adjacent to the distal nose ring, and the distal nose ring directly contacts or is adjacent to the nose piece; or further comprising:
   a proximal isolation ring, a proximal nose ring, a distal isolation ring, and a distal nose ring,
   wherein a portion of the plugging head directly contacts or is adjacent to the proximal isolation ring or the isolation plate, wherein a portion of the proximal isolation ring directly contacts or is adjacent to the proximal sealing element, wherein a portion of the proximal sealing element directly contacts or is adjacent to the proximal nose ring, wherein the proximal nose ring directly contacts or is adjacent to a portion of the isolation plate, wherein a portion of the isolation plate directly contacts or is adjacent to the distal isolation ring or the nose piece, wherein a portion of the distal isolation ring directly contacts or is adjacent to the distal sealing element, wherein a portion of the distal sealing element directly contacts or is adjacent to the distal nose ring, and wherein a portion of the distal nose ring directly contacts or is adjacent to the nose piece.

6. The sealing plug assembly of claim 1, wherein the isolation plate includes a cylindrical raised portion on a distal face of the isolation plate, a cylindrical depressed portion on a proximal face of the isolation plate, an axial passage that passes through a center of the isolation plate, and one or more radial fluid pathways, wherein the radial fluid pathways connect an isolation plate radial port to an isolation zone port, wherein isolation plate radial port is located on an outer edge of the isolation plate and the isolation zone port is located on an inner edge of the cylindrical depressed portion of the isolation plate; and
   wherein the isolation radial port is fluidly connected by the radial fluid pathway to the isolation zone port, wherein the isolation zone port is fluidly connected by the axial passage to the nose flow pathway of the nose piece, and the nose flow pathway of the nose piece is fluidly connected to the product port located on an exterior of the nose piece.

7. A method of stopping a pipe containing a product, comprising:
   providing a sealing plug assembly connected to a sealing plug housing, wherein the sealing plug assembly includes a plugging head, a proximal sealing element, a distal sealing element, an isolation plate, and a nose piece,
   wherein the proximal sealing element is located closer to the plugging head than the distal sealing element, and wherein proximal sealing element protrudes around an exterior of the sealing plug assembly,
   wherein the distal sealing element is located closer to the nose piece than the proximal sealing element, and wherein the distal sealing element protrudes around the exterior of the sealing plug assembly, and
   wherein the isolation plate is contained in an interior of the sealing plug assembly and located between the proximal sealing element and the distal sealing element, wherein the nose piece has a product port located on the exterior of the sealing plug assembly and the product port is connected or fluidly connected to the isolation plate by a nose flow pathway; and
   sealing the pipe containing the product by sealing an outer edge of the proximal sealing element and an outer edge of the distal sealing element against an interior surface of the pipe.

8. The method of claim 7, further comprising:
   accessing the product port by cutting an opening into the pipe containing the product, and opening the nose flow pathway of the product port by inserting a bleed lance into the product port and rotating the bleed lance.

9. The method of claim 8, further comprising:
wherein the bleed lance includes a stab inlet, a body, and a bleed lance exit,
wherein the body includes a hollow pipe or tube, and the body is connected to the stab inlet and the bleed lance exit by a lance flow pathway, and
wherein the product can be a liquid, a slurry, a gas, or any combination thereof,
flowing the product from the fluid product though the bleed lance exit.

10. The method of claim 9,
attaching a tube or hose to the bleed lance exit and collecting at least a portion of the product.

11. A system for stopping a pipe containing a liquid, gas, or slurry product, the system comprising:
a plugging head, a proximal sealing element, a distal sealing element, an isolation plate, and a nose piece,
wherein the proximal sealing element is located closer to the plugging head than the distal sealing element, and wherein proximal sealing element protrudes around an exterior of the sealing plug assembly,
wherein the distal sealing element is located closer to the nose piece than the proximal sealing element, and wherein the distal sealing element protrudes around the exterior of the sealing plug assembly, and
wherein the isolation plate is contained in an interior of the sealing plug assembly and located between the proximal sealing element and the distal sealing element,
wherein the nose piece has a product port located on the exterior of the sealing plug assembly and the product port is connected to the isolation plate by a nose flow pathway; and
a bleed lance, wherein the bleed lance includes a stab inlet, a body, and a bleed lance exit, wherein the body includes a hollow pipe or tube, and the body is connected to the stab inlet and the bleed lance exit by a lance flow pathway, and
wherein the product port of the nose piece is configured to or has a product port surface that is complimentary to the stab inlet of a bleed lance, and the product port is configured to be opened or closed by insertion and rotation of the stab inlet of the bleed lance.

* * * * *